United States Patent
Wang

(10) Patent No.: US 12,541,783 B2
(45) Date of Patent: Feb. 3, 2026

(54) METHOD, SYSTEM, AND ARTICLE OF MANUFACTURE FOR COMPUTER SEARCH ENGINE RANKING FOR ACCESSORY AND SUB-ACCESSORY REQUESTS

(71) Applicant: eBay Inc., San Jose, CA (US)

(72) Inventor: Dingxian Wang, Kirkland, WA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/526,882

(22) Filed: Dec. 1, 2023

(65) Prior Publication Data

US 2024/0104621 A1 Mar. 28, 2024

Related U.S. Application Data

(63) Continuation of application No. 17/088,134, filed on Nov. 3, 2020, now Pat. No. 11,875,390.

(51) Int. Cl.
*G06Q 30/00* (2023.01)
*G06F 16/9538* (2019.01)
*G06N 5/025* (2023.01)
*G06Q 30/0601* (2023.01)

(52) U.S. Cl.
CPC ..... *G06Q 30/0627* (2013.01); *G06F 16/9538* (2019.01); *G06N 5/025* (2013.01); *G06Q 30/0643* (2013.01)

(58) Field of Classification Search
CPC ...... G06Q 30/0601–0645; G06Q 30/08; G06F 16/9538; G06N 5/025
See application file for complete search history.

(56) References Cited

U.S. PATENT DOCUMENTS

| | | |
|---|---|---|
| 2008/0195601 A1 | 8/2008 | Ntoulas et al. |
| 2009/0076927 A1* | 3/2009 | Sridhar .............. G06Q 30/0601 707/999.005 |
| 2010/0082571 A1* | 4/2010 | Shivaswamy ........... G06F 16/35 707/E17.069 |
| 2010/0179956 A1 | 7/2010 | Jammalamadaka et al. |
| 2011/0161182 A1* | 6/2011 | Racco ................ G06Q 30/0277 705/26.1 |
| 2013/0268561 A1 | 10/2013 | Christie et al. |
| 2016/0260152 A1 | 9/2016 | Lagoni et al. |

(Continued)

FOREIGN PATENT DOCUMENTS

WO 2009/029689 A1 3/2009

OTHER PUBLICATIONS

Wang et al., Explainable Reasoning over Knowledge Graphs for Recommendation, Nov. 12, 2018, accessed at [chrome-extension://efaidnbmnnnibpcajpcglclefindmkaj/https://arxiv.org/pdf/1811.04540] (Year: 2018).*

(Continued)

*Primary Examiner* — Jeffrey A. Smith
*Assistant Examiner* — Lindsey B Smith
(74) *Attorney, Agent, or Firm* — Shook, Hardy & Bacon L.L.P./eBay Inc.

(57) ABSTRACT

Various embodiments improve search technologies and computer information retrieval by executing a query via ranking a set of search result candidates higher than another set search result candidates based at least in part on the query and determining that a first set of search result candidates are indicative of a sub-accessory to an accessory or an accessory itself.

20 Claims, 11 Drawing Sheets

(56) References Cited

U.S. PATENT DOCUMENTS

2019/0392082 A1    12/2019  Bell et al.
2020/0133967 A1*   4/2020   Shukla ............... G06F 16/3334

OTHER PUBLICATIONS

"A Tool for Learning Vector Representations of Words and Entities from Wikipedia," Retrieved from the Internet URL: https://github.com/wikipedia2vec/wikipedia2vec, Accessed on Nov. 10, 2020, 4 pages.
Harfang, Managing Trees and Hieraches in Access, Mar. 28, 2011, Experts-Exchange.com, accessed at [https://www.experts-exchange.com/articles/2153/Managing-Trees-and-Hierachies-in-Access.html] (Year: 2011).
Office Action received for European Application No. 21202329, mailed on Feb. 13, 2024, 8 pages.
Office Action received for Chinese Patent Application No. 202111125190.6, mailed on Apr. 9, 2025, 30 pages (18 pages of English Translation and 12 pages of Original Office Action).
Office Action received for Chinese Patent Application No. 202111125190.6, mailed on Sep. 20, 2025, 17 pages (4 pages of English Translation and 13 pages of Original Office Action).

* cited by examiner

METHOD, SYSTEM, AND ARTICLE OF MANUFACTURE FOR COMPUTER SEARCH ENGINE RANKING FOR ACCESSORY AND SUB-ACCESSORY REQUESTS

CROSS-REFERENCE TO RELATED APPLICATIONS

This application is a continuation of, and claims priority from, U.S. patent application Ser. No. 17/088,134, filed on Nov. 3, 2020, the contents of which are hereby incorporated herein in their entirety by reference.

BACKGROUND

Various search engine technologies receive user input, such as a query with one or more search terms, in order to retrieve information particular to the input. For example, after launching a web browser or other application (e.g., a marketplace web application), a user can input, within a search engine field, search terms of a query corresponding to a particular resource or topic (e.g., documents, links, web pages, item listings, etc.). Responsively, one or more servers hosting the search engine logic can execute the query by ranking and retrieving data from various data sources and cause a web page to display various ranked search results associated with the particular resource or topic. The user may then select one or more of the various ranked result identifiers.

Existing search technologies and computers are inaccurate in the ranking and returning of relevant search results when queries are for accessories (e.g., a component part of an item) or sub-accessories (e.g., a sub-part of the accessory). For example, when queries are for accessories, existing search engines often provide highly ranking search results that indicate a sub-part or other component of the accessory instead of the actual accessory itself. This is referred to as the "part-of-part" problem. This problem is prevalent in certain domains, such as the automotive industry where there are various items, accessories to those items, and sub-accessories of the accessories. Existing technologies are also deficient in terms of computing resource consumption and negatively affect the user experience, among other things.

BRIEF SUMMARY

Particular embodiments of the present disclosure include a computer-implemented method, a non-transitory computer storage medium, and a system. Some aspects are directed to improving search technologies (e.g., search engines, web applications, browsers, etc.) and computer information retrieval by executing a query by ranking a set of search result candidates higher than another set search result candidates based at least in part on the query and determining (e.g., via a word embedding model and a knowledge graph) that a first set of search result candidates are indicative of a sub-accessory to an accessory. This also improves functionality and computing resource consumption, among other things. Other advantages, embodiments, improvements and the like are described herein.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein.

DETAILED DESCRIPTION

Figure 1:
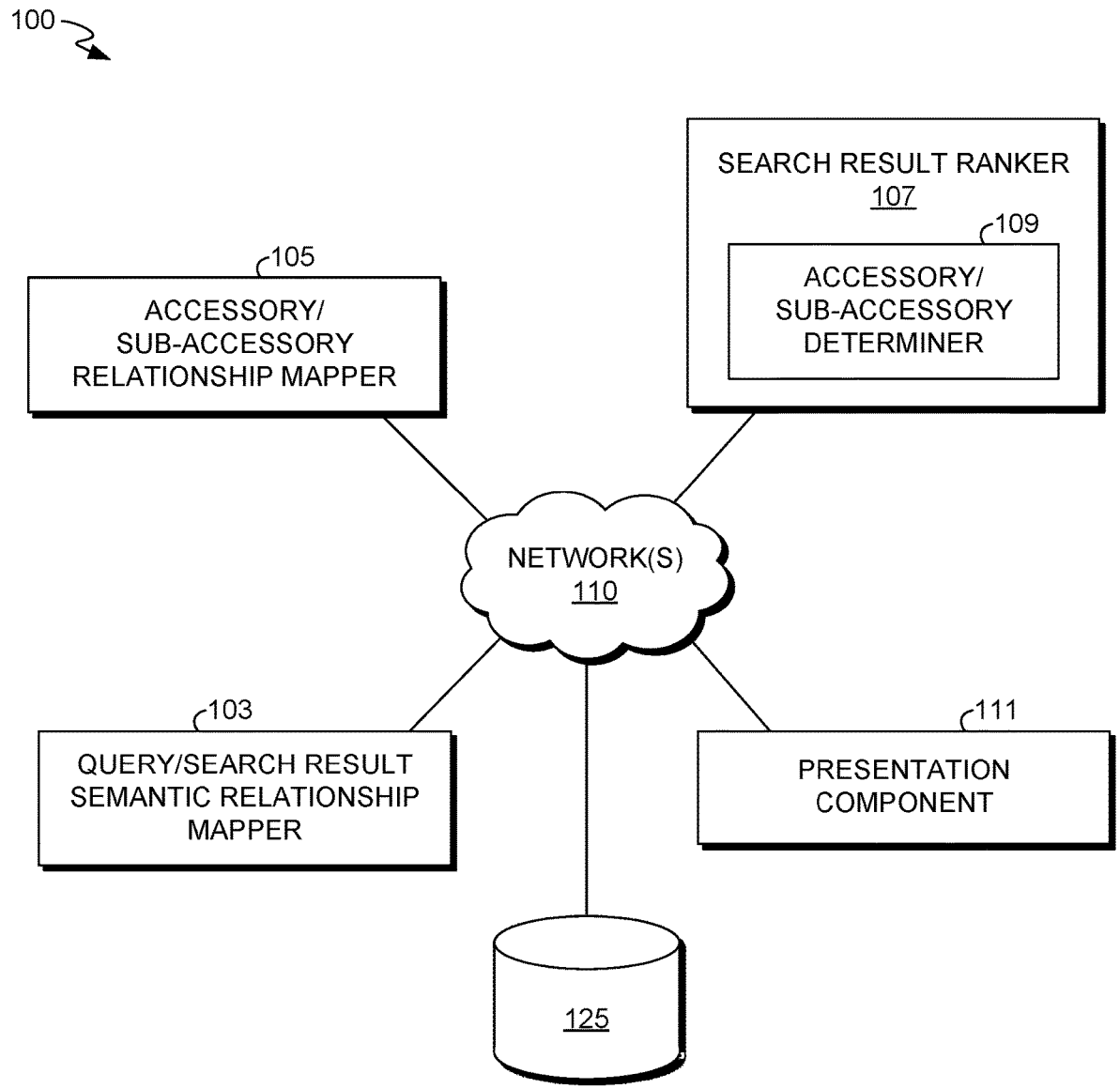
FIG. 1 is a block diagram of an illustrative system architecture in which some embodiments of the present technology may be employed, according to some embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Existing search technologies (e.g., web browser search engines, web applications, e-commerce applications, etc.) and computers themselves are inaccurate in the retrieval, ranking, and the returning of relevant search results when queries are for accessories (e.g., a supplemental component associated with the accessory) or for sub-accessories. In some cases, this is at least partially due to existing search and rank functionality (e.g., TF-IDF or particular machine learning logic), which cannot, by itself, adequately distinguish between accessories and sub-accessories. When queries are for accessories, for example, existing search technologies and computers often provide highly ranked search results that indicate a sub-part or other component of the accessory instead of the actual accessory itself, which is inaccurate.

This concept of not being able to properly distinguish between accessories and sub-accessories leads to what is known as the "part-of-part" problem, as described above. That is, computers retrieve and highly rank a search result corresponding to a sub-part of an accessory, instead of the accessory itself even though the accessory has been requested. Alternatively, computers retrieve and highly rank a search result corresponding to an accessory, instead of the sub-accessory itself even though the sub-accessory has been requested.

In an illustrative example of this problem, a user may issue a query requesting listings for a car (the "item") make X, model Y door (the "accessory"). However, existing search engine technologies will often provide highly ranked search results, such as car make X, model Y door handle (a "sub-accessory") instead of search results corresponding to the car door itself. This is inaccurate because a car door and car door handle are different items, even though they are related and only the car door was requested. In many cases, search results corresponding to the sub-accessory is ranked higher than search results corresponding to the accessory itself even though the query is for the accessory.

Making these distinctions is difficult for computers and existing search technologies because the retrieval and ranking of data is typically based on static computer query term matching and static weighting between terms in the query and search result candidates. Also, sub-accessories tend to have similar names as accessories. Accordingly, for example, regardless of whether or not a user is issuing a query for an accessory (e.g., a car door) and not a sub-accessory (e.g., the car-door handle), because most terms between the query and search result candidates may otherwise match and because there may be similar language between accessories and sub-accessories, existing computers infer that the car door handle and car door are to receive similar rankings. Compounding this problem is that users, such as sellers, often inadequately describe accessories and sub-accessories because describing them may require a certain degree of expertise. Also, users often deliberately include a lot of popular but unrelated item description text in a current product title to obtain a higher search ranking. This inaccurately skews or biases search result rankings, since existing technologies take these non-important terms into account for ranking. Accordingly, based on one or more of these issues, the car door handle, for example, may still inaccurately be ranked high on a search result page even though the car door has been requested.

Additionally, such inaccuracy of existing search technologies and computers leads to unnecessary computer resource consumption (e.g., I/O, network bandwidth, throughput, CPU utilization). Because existing technologies incorrectly rank, retrieve, and render sub-accessories to a search result page when accessories have been requested (or vice versa), users have to keep redundantly generating multiple different queries or input to receive relevant search results. However, this is computationally and resource intensive. For example, an optimizer engine of a database manager module calculates a query execution plan (e.g., calculates cardinality, selectivity, etc.) each time a query is issued, which requires a database manager to find the least expensive query execution plan to fully execute the query. This decreases throughput and increases network latency, and can waste valuable time when multiple queries for a desired accessory or sub-accessory are issued. Most database relations contain hundreds if not thousands of records. Repetitively calculating query execution plans on this quantity of records decreases throughput and increases network latency. Generating these redundant queries to locate the correct accessory/sub-accessory also increases storage device I/O (e.g., excess physical read/write head movements on non-volatile disk) because each time a user issues a query, the computing system often has to reach out to disk to perform a read or write operation, which is time consuming, error prone, and can eventually wear on components, such as a read/write head.

Generating these redundant queries for accessories or sub-accessories also causes excessive packet generation costs that adversely affect computer network communications. Each time a user issues a query for an accessory, for example, the contents or payload of the query is typically supplemented with header information or other metadata within a packet in TCP/IP and other protocol networks that must traverse over the network. Accordingly, for example, when this functionality is multiplied by all the queries needed to obtain the desired accessory (because multiple sub-accessories keep getting surfaced), there are network utilization and latency costs by repetitively generating this metadata and sending it over a computer network.

Existing technologies also negatively affect the user experience. As stated above, because existing technologies incorrectly rank, retrieve, and render sub-accessories to a search result page when accessories have been requested (and vice versa), users have to keep redundantly generating multiple different queries or input to receive relevant results. Accordingly, users have to redundantly click, query, drill down, or perform other user activity to locate relevant search results, thereby making it arduous for the user to navigate a user interface or otherwise locate relevant search results.

Various embodiments of the present disclosure provide one or more technical solutions to the technical problems described above, as well as other problems. In operation, various embodiments of the present disclosure are directed to executing a query by ranking a set of search result candidates higher than another set of search result candidates based at least in part on the query and determining (e.g., via a word embedding model and a knowledge graph) that a first set of search result candidates are indicative of a sub-accessory to an accessory (or an accessory itself). By affirmatively being able to identify when search result candidates refer to a sub-accessory, various embodiments accurately rank and provide relevant search results. For example, using the example above, if the user requested the specific car door, various embodiments would be able to differentiate between search results that indicate the car door and a car door handle (which existing technologies do not adequately do), and affirmatively rank the car door results higher than the car door handle results based on this differentiation.

Some embodiments are directed to determining that particular search result candidates are indicative of a sub-accessory to an accessory based at least in part on using a word embedding model (e.g., a Named Entity Recognition (NER) tagging embedding or WORD2VEC) or other semantic relationship component to determine one or more semantic relationships between terms of the query and various search result candidates. For example, if an item title reads "HONDA 15 HP $300," embodiments can infer that a semantically similar set of words are "Honda boat motor" based on a word embedding, which is more indicative of an accessory than a sub-accessory or item the accessory belongs to.

A "word embedding" as described herein represents vectors in vector space (e.g., also known as feature space or linear space) based on a contextual (e.g., semantic) similarity, feature similarity, and/or other similarity (e.g., amount of user interaction), such as between each vector or the natural language sequence (e.g., word) the vector represents. In some embodiments, two or more vectors that are semantically similar (e.g., have the same or similar meaning) may be mapped or embedded near each other in vector space regardless of the syntactic similarity (e.g., similarity between word structure or appearance). Through this semantic relationship functionality, computers can understand whether queries and search result candidates (e.g., item titles) are referring to the same item, such as the same accessory and/or sub-accessory in order to improve ranking for particular search result candidates for a given query.

A "feature vector" (also referred to as a "vector") as described herein includes one or more real numbers, such as a series of floating values or integers (e.g., [0, 1, 0, 0]) that represent one or more other real numbers, a natural language (e.g., English) word and/or other character sequence (e.g., a symbol (e.g., @, !, #), a phrase, and/or sentence, etc.). Such natural language words and/or character sequences correspond to the set of features and are encoded or converted into corresponding feature vectors so that computers can process the corresponding extracted features.

Various embodiments additionally or alternatively determine that particular search result candidates are indicative of a sub-accessory to an accessory (or accessory itself) based at least in part on using a knowledge graph that indicates relationships between various accessories and sub-accessories. A "knowledge graph" or "network graph" is a pictorial representation or visualization for a set of objects where pairs of objects are connected by links or "edges." The interconnected objects are represented by points termed "vertices," and the links that connect the vertices are called "edges." Each node or vertex represents a particular position in a one-dimensional, two-dimensional, three-dimensional (or any other dimensions) space. A vertex is a point where one or more edges meet. An edge connects two vertices. In an illustrative example, a node may represent the accessory of an outboard boat motor, and the node may be connected, via edges, to various other nodes representing sub-accessories of the outboard boat motor, such as the boat motor propeller or the oat motor tiller. These knowledge graphs help computers directly identify the relationship between accessories and sub-accessories in order to improve ranking particular search results for a given query.

Some embodiments of the present disclosure additionally or alternatively use a classifier machine learning model (and/or any other suitable machine learning model, such as a clustering or regression-type model) in order to determine whether search result candidates and/or queries are indicative of an accessory or sub-accessory to the accessory so that the appropriate ranking can occur for the search results candidates when a query is executed. Any suitable inputs can be used into the machine learning model, such as data from the word embedding model and/or knowledge graph described above, and/or any other information, such as a condition of an accessory/sub-accessory (e.g., whether it is new or used), a price of the accessory/sub-accessory, and/or other aspect features (e.g., size, weight, color) of the accessory/sub-accessory to help distinguish between accessories and sub-accessories.

In an example of the machine learning model using the illustrative above, for the item title that reads "HONDA 15 HP $300," embodiments can infer that this is likely referring to a particular HONDA boat motor accessory even though the title may appear to refer to a HONDA boat (or car) item itself and does not explicitly state a boat motor accessory. For example, using the $300 dollar price feature, it may be the case (e.g., in training) that most search result candidates labeled as "HONDA boat motor" were sold at a price between $200 and $800 (as opposed to any sub-accessory of the boat motor, which may average to be much lower in price). Accordingly, embodiments can weight the probability of this item title more likely referring to the HONDA motor accessory. Likewise, using the word embedding as described above, the closest semantically similar word embedding may be "HONDA boat motor." Likewise, using a knowledge graph, embodiments further weight the probability higher by explicitly mapping the boat motor as an accessory and not a sub-accessory. Accordingly, considering multiple factors, embodiments can weight the probability of this item title more likely to be referring to the specific accessory, as opposed to any item or sub-accessory.

Various embodiments of the present disclosure improve existing search technologies by ranking a set of search result candidates higher than another set search result candidates based at least in part on the query and determining that the first set of search result candidates are indicative of a sub-accessory to the accessory (and/or an accessory itself). By affirmatively being able to identify when search result candidates refer to a sub-accessory and/or accessory (unlike existing computers and search technologies), various embodiments accurately rank and provide relevant search results. Accordingly, these embodiments improve the inaccuracy of existing computers and search technologies.

Various embodiments of the present disclosure also improve computer resource consumption, compared to existing computers and search technologies. As described above, because existing technologies incorrectly rank, retrieve, and render sub-accessories to a search result page when accessories have been requested (or render accessories when sub-accessories have been requested), users have to keep redundantly generating multiple different queries or input to receive relevant search results, which is costly in terms of throughput, network latency, and I/O, among other things. However, particular embodiments decrease network utilization and decrease network latency. This is because these embodiments accurately rank, retrieve, and render the appropriate accessory or accessory depending on the query. Accordingly, users do not have to keep redundantly generating multiple different queries to receive relevant search results. Therefore, in terms of network utilization, throughput, and network latency, database managers are executing far less query execution plans on much fewer data base records, so operations like selectivity and cardinality are exponentially being avoided, thereby leading to less network utilization and latency.

Regarding I/O costs, various embodiments have to reach out to disk to perform a read or write operation fewer times relative to existing search technologies. This is because these embodiments correctly rank, retrieve, and render sub-accessories to a search result page when accessories have been requested (or render accessories when sub-accessories have been requested), so users do not have to keep redundantly generating multiple different queries or input to receive relevant search results, resulting in fewer I/O operations. This reduces the wear on I/O components, such as a read/write head.

Particular embodiments also improve network communications and packet generation costs. As described above, generating these redundant queries also causes excessive packet generation costs that adversely affect computer network communications. However, these embodiments accurately rank, retrieve, and render sub-accessories to a search result page when accessories have been requested (or render accessories when sub-accessories have been requested), so users do not have to keep redundantly generating multiple different queries or input to receive relevant search results. This reduces the amount of header information or other metadata within a packet in TCP/IP and other protocol networks that has to traverse over the network. Less packets in general are also being communicated over a computer network. Therefore, more bits are available for a network to process for bandwidth purposes, and latency is reduced, as well as throughput increased.

Various embodiments also improve the user experience. As stated above, because existing technologies incorrectly rank, retrieve, and render sub-accessories to a search result page when accessories have been requested (or render accessories when sub-accessories have been requested), users have to redundantly click, query, drill down, or perform other user activity to locate relevant search results, thereby making it arduous for the user to navigate a user interface or otherwise locate relevant search results. However, with various embodiments of the present disclosure, users do not have to redundantly click, query, drill down, or perform other user activity to locate relevant search results because these embodiments accurately rank, retrieve, and render sub-accessories to a search result page when accessories have been requested (and vice versa).

FIG. 1 is a block diagram of an illustrative system architecture 100 in which some embodiments of the present technology may be employed, according to some embodiments. Although the system 100 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the system 100 are distributed across a cloud computing system (e.g., the computer environment 1000 of FIG. 10). In other embodiments, the system 100 is located at a single host or computing device (e.g., the computing device 1100 of FIG. 11). In some embodiments, the system 100 illustrates executable program code such that all of the illustrated components and data structures are linked in preparation to be executed at runtime.

System 100 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 100 may be provided via a software as a service (SAAS) model, e.g., a cloud and/or web-based service. In other embodiments, the functionalities of system 100 may be implemented via a client/server architecture.

The system 100 is generally directed to ranking one or more search result candidates based on determining whether the one or more search result candidates are indicative of an accessory and/or a sub-accessory. An "accessory" as described herein refers to any component associated with an item. In some embodiments, an accessory refers to a part of the item. Such part refers to a physical portion of the item that, in some instances, is smaller in size relative to the item itself. For example, an item can be an entire car, and an accessory to the car can be the car tire, the car engine, the car door, the car trunk, or any suitable portion of the car. In some embodiments, the part or accessory is an attachable component that makes of a portion of the item. This means that that part or accessory can be coupled to the item in some way (e.g., via screws, bolts, friction fit, adhesive, etc.). This applies to any of the "car" examples described above.

In some embodiments, an accessory refers to a supplemental component associated with the item. In some embodiments, such "supplemental" component refers to any suitable component that is configured to be used in conjunction with the item. For example, the accessory can refer to a complimentary good relative to the item. In another example, the accessory can refer to any article of manufacture that configured to be tied with or bundled together with an item. Such supplemental components typically do not denote any size or attachment relationships, unlike accessory "parts." That is supplemental components in various instances are not necessarily attached to or are not necessarily smaller relative to the items associated with such supplemental component. In an illustrative example of an accessory in "supplemental" component embodiments, the "accessory" can be a smart phone case and the "item" can be a smart phone. Accordingly, the smart phone case is configured to be used with the smart phone. In another example, a supplemental component can be an air pump and the item can be a basketball, both of which are configured to be used together.

A "sub-accessory" as described herein refers to any component associated with an accessory. In some embodiments, a sub-accessory refers to a sub-part of the accessory. Such sub-part refers to a physical portion of the accessory that is, in some instances, smaller in size relative to the accessory itself (and even relatively smaller than the item). For example, using the illustration above, the accessory to the car can item be the car engine and the sub-accessory to the engine accessory can be a timing belt of the engine. In another example, the accessory can be a car tire assembly (with rims and tire tread), and the sub-accessory can be the rims. In some embodiments, the sub-part or sub-accessory is an attachable component that makes of a portion of the accessory. This means that that sub-part or sub-accessory can be coupled to the item in some way (e.g., via screws, bolts, friction fit, adhesive, etc.). For example, using the illustration above, the rim can be friction fitted to the car tire.

In some embodiments, a sub-accessory refers to a supplemental component associated with the accessory. In some embodiments, such "supplemental" component refers to any suitable component that is configured to be used in conjunction with the accessory. For example, the sub-accessory can refer to a complimentary good relative to the accessory. In another example, the sub-accessory can refer to any article of manufacture that configured to be tied with or bundled together with an accessory. Such supplemental components typically do not denote any size or attachment relationships, unlike sub-accessory "sub-parts." That is supplemental components in various instances are not necessarily attached to or are smaller relative to the accessories associated with such supplemental component. Using the illustrative example above, a sub-accessory in "supplemental" component embodiments can be a particular smart phone case tool that is configured to remove the specific smart phone case accessory from the phone item. Accordingly, the smart phone case tool is configured to be used with the smart phone case.

Referring back to FIG. 1, the system 100 includes a query/search result semantic relationship mapper 103, an accessory/sub-accessory relationship mapper 105, a search result ranker 107, which includes an accessory/sub-accessory determiner 109, a presentation component 111, and storage 125, each of which are communicatively coupled to the network(s) 110. The network(s) 110 can be any suitable network, such as a Local Area Network (LAN), a Wide Area Network (WAN), the internet, or a combination of these, and/or include wired, wireless, or fiber optic connections. In general, network(s) 110 can be any combination of connections (e.g., APIs or linkers) or protocols that will support communications between the components of the system 100.

The query/title semantic relationship mapper 103 is generally responsible for determining the semantic relationships between one or more queries and one or more search result candidates (e.g., item titles). Determining semantic relationships includes determining what words have a same or similar (e.g., within a threshold distance when the word represent vectors) meaning even if they are syntactically different. "Syntax" or syntactic properties refers to the structure of character sequences of the content (as opposed to the semantics or meaning), such as the structure of a sentence. For example, "car" and "far" are syntactically similar but have two different definitions so they are not semantically similar. Rather, "far" and "distant" are semantically similar because they mean the same thing, even though they are structurally or syntactically different.

In some embodiments, the query/title semantic relationship mapper 103 is or uses a Natural Language Processor (NLP) component to perform its functionality. For instance in some embodiments, the query/title semantic relationship mapper 103 tokenizes query and item listing titles into its constituent words and some or each of the words are tagged with a part-of-speech identifier.

"Tokenization" or parsing in various embodiments corresponds to a computer-implemented process that segments the content into words, sentences, symbols, character sequence, and/or other elements of the content. This can include a set of rules for analyzing a message, such as word and/or part of speech (POS) order. For example, for the sentence "the girl jumped happily", the syntax may correspond to a word order where the structure is subject-verb-adverb (or subject, verb, object, etc.). In various embodiments, each word of a query and search result candidate are tagged with such POS identifiers.

In some embodiments, NLP derives semantic and syntactic content of semi-structured or unstructured data (e.g., data in image files, data in blogs, posts, websites, text descriptions of classifier models, etc.). This is in contrast to analyzing "structured" data, such as data in a database. NLP can be configured to parse content to determine semantic context (e.g., meaning of words by analyzing each word in the content against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify the interest contexts. The syntactic and semantic elements can include information such as word frequency, word meanings, text font, italics, hyperlinks, proper names, noun phrases, parts-of-speech (e.g., noun, adverb, adjective, and the like) and/or the context of surrounding words. Other syntactic and semantic elements are also possible.

In some embodiments the query/search result semantic relationship mapper 103 additionally or alternatively uses other NLP-based functionality, such as Named Entity Recognition (NER). NER is an information extraction technique that identifies and classifying elements or "entities" in natural language text into predefined categories. Such predefined categories may be indicated in corresponding tags or labels. In various embodiments, NER (and NLP in general) thus transforms unstructured data to data that is structured, and therefore machine-readable and available for processing. Entities can be, for example, names of people, specific organizations, specific locations, specific times, specific quantities, specific monetary values, specific percentages, and the like. Likewise, the corresponding tags or labels can be "people," "organizations," "location,", "time" and the like. In this context of the present disclosure, these tags or labels can indicate whether entities or words refer to accessories or sub-accessories based on NER.

In an illustrative example using the query/search result context, there may be an item title called "APPLE IPHONE 7 case beautiful NIB," which is a search result candidate. An in item title describes an item that is (or has been or will be) for sale in an electronic marketplace. According to various embodiments, the NER functionality can tag this item title as follows "APPLE [brand], IPHONE [model], case [accessory], beautiful [x], NIB [x]. The tag "[model]" can alternatively be "[item]" in some embodiments. In various embodiments, the [x] tags are machine-readable indicators to a computer to remove such terms for further processing (e.g., placing as inputs into a classifier or word embedding). For example, a 200-dimensional feature vector for the item title illustrated above, where the item title is converted into "APPLE IPHONE 7 case" by removing the words with the "[x]" tag. This way, for example, the query/title semantic relationship mapper 103 can generate or receive word embeddings for "APPLE" "IPHONE7" and "case," as opposed to the entire item title.

Using the example above, the query/search result semantic relationship mapper 103 can generate, for example, a 50-dimensional tag feature vector for the item title with POS tagging (e.g., as described above). Accordingly, based on NER, "APPLE," "IPHONE7", and "case" is tagged or embedded in a word embedding as "brand_apple", "model_iphone7", and "accessory_case." In various embodiments, this same NER process is performed for queries in order to determine whether queries are referring accessories or sub-accessories and match queries with corresponding search result candidates (e.g., via the search result ranker 107).

In some embodiments, the query/search result semantic relationship mapper 103 additionally or alternatively uses word embeddings to perform its functionality (e.g., even without NER functionality). In this way, different words or other characters in queries and/or titles can be converted into feature vectors of numerical values and embedded in feature space based on how semantically similar (e.g., via cosine or Euclidian distance) each word or other character sequence is to each other. In various embodiments, such word embeddings are produced by WORD2VEC, GloVe, and/or any other suitable word embedding models. Word embeddings are described in more detail below.

In some embodiments, the query/search result semantic relationship mapper 103 performs its functionality offline (e.g., not in response to any runtime query request). For example, in "offline" embodiments, the query/search result semantic relationship mapper 103 can analyze various predefined or predetermined historical query/title pairs (e.g. located in storage 125) and can train, via a machine learning model, on such query/title pairs. In this way, particular embodiments can learn, over various training epochs, what search result candidates (and/or words within the search result) candidates are similar (e.g., are within a particular cosine distance) to particular queries (and/or the associated words that make up the queries).

In some embodiments, the query/search result semantic relationship mapper 103 additionally or alternatively performs its functionality in "online" or runtime environments (as opposed to only offline), such as in response to a live query request. In some embodiments, the query/search result semantic relationship matter 103 maps the runtime query to one or more semantically similar search result candidates (e.g., that have been trained offline, as described above). For example, some embodiments convert or encode the query into a feature vector and map the feature vector into a word embedding based on the query's semantic similarity relative to item titles, as described herein.

The accessory/sub-accessory relationship mapper 105 explicitly maps relationships between one or more accessories and one or more sub-accessories to the one or more accessories. For example, the accessory/sub-accessory relationship mapper 105 can use one or more predefined rules (e.g., conditional statements) and/or one or more data structures or data objects (e.g., hash maps or lookup tables) to determine the relationships between an accessory and its given sub-accessory. For example, a lookup table may represent an item that is indexed or keyed by a field that represents multiple accessories that are mapped to corresponding fields representing one or more sub-accessories to corresponding accessories. In some embodiments, the accessory/sub-accessory relationship mapper 105 can use one or more knowledge graphs or relationship graphs (e.g., FIG. 3) to perform its functionality of explicitly mapping relationships between one or more accessories and one or more sub-accessories to the one or more accessories.

The search result ranker 107 ranks search result candidates based at least in part on term(s) in the associated query and functionality performed by the accessory/sub-accessory determiner 109. The accessory/sub-accessory determiner 109 is generally responsible for determining that a particular set of search result candidates for a particular query are indicative of a sub-accessory of an accessory (and/or are indicative of the accessory itself). In some embodiments, such determinations are made based at least in part on the query, information determined by the query/search result semantic relationship mapper 103 and/or the accessory/sub-accessory relationship mapper 105.

In an illustrative example, at runtime, a user, using a user computing device, may issue a query that reads, "Brand A, model B, treads." The query/search result semantic relationship mapper 103 may determine that "treads" is semantically similar to "tire" and accordingly tag tread with "tires" in vectorized form. The query/search result semantic relationship mapper 103 may determine that "Brand A, model B" is indicative of a particular "bicycle" (e.g., because its vector is close to bike vectors in vector space) and accordingly input the "bicycle" tag next to "Brand A, model B." The accessory/sub-accessory relationship mapper 105 may responsively determine that the query is referring to a bike tire accessory of the Brand A, model B bike item (e.g., via mapped relationships between accessory and sub-accessory nodes in a knowledge graph). Responsively, in some embodiments the accessory/sub-accessory determiner 109 classifies or otherwise determines that the query "Brand A, model B treads" is indicative of an "accessory" (or particular brand A, model B bike seat accessory). In some embodiments, the accessory/sub-accessory determiner 109 responsively determines which search results candidates (e.g., via the query/search result semantic relationship mapper 103 and/or the accessory/sub-accessory relationship mapper 105) for the query are indicative of the accessory brand A, model B tire itself and/or sub-accessories (e.g., a brand A model B bike tire reflector) to the accessory. In response to this functionality, in some embodiments, the search result ranker 107 searches for, and ranks as highest, search result candidates of the Brand A, model B bike seat (and not any component part of the bike seat) based on the determinations made by the accessory/sub-accessory determiner 109.

In some embodiments, the accessory/sub-accessory determiner 109 is or uses one or more machine learning models to generate a particular decision statistic prediction (e.g., a classification prediction of a classifier model, a clustering prediction of a clustering model, or a regression prediction for a regression model). Such machine learning model(s) may be any suitable model of any suitable type. For example, such machine learning model can be supervised or unsupervised and can be or include a neural network (e.g., a Convolutional Neural Network (CNN) or Siamese Neural Network), decision trees, random forests, support vector machine, Naïve Bayes, and or clustering (e.g., K-means clustering).

In some embodiments, the accessory/sub-accessory determiner 109 (or the machine learning model(s) it uses) provides various vectors of training data as input. For example, such input can be the outputs generated by the query/search results semantic relationship mapper 103, the accessory/sub-accessory relationship mapper 105, price of items indicated in a query and/or search result candidate, condition of item indicated in a query and/or search result candidate, and/or other aspect features (e.g., a Vehicle Identification Number (VIN)). In various embodiments, the accessory/sub-accessory determiner 109 classifies or otherwise predicts, via one or more machine learning models, whether a query and/or search result candidate is an "accessory" or "sub-accessory." In certain embodiments, these predictions or target classifications may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem.

Certain embodiments can learn the parameters of the machine learning model(s) so that similar features of the input are closer to each other in vector space (e.g., all parts that that are within a threshold price range are closer to each other in feature space). In some embodiments, this training is done in supervised manner using a loss function (e.g. Triplet loss or GE2E loss) that try to map similar features into one classification or cluster. Once the model is trained, embodiments can represent a feature vector in vector space by aggregating (e.g. mean/median or dot product) the features of the inputs obtained by passing these inputs through the trained model. For example, in supervised learning contexts, a training component can receive user input of a search result candidate (and/or query) and a specific label, such as "accessory," "sub-accessory" like that indicates whether the particular result candidate refers to an accessory or sub-accessory. Embodiments, can then run the search results candidate with the corresponding labels through a machine learning model so that different feature values and weights are learned according to the label. In this way, when a search result candidate or query is received, corresponding weights or features can be learned.

In some embodiments, the training component learns features from the inputs in the storage 125 and responsively weights them during training. A "weight" in various instances represents the importance or significant of a feature or feature value for prediction. For example, each feature may be associated with an integer or other real number where the higher the real number, the more significant the feature is for its prediction. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores, which are described in more detail below. In many instances, only a selected set of features are primarily responsible for a determination of whether a query and/or search result candidate is predicted to be an accessory or sub-accessory.

In another illustrative example of a training component, some embodiments learn an embedding of feature vectors based on deep learning to detect similar features between queries and search result candidates in feature space using distance measures, such as cosine (or Euclidian) distance. For example, each labeled query or search result candidate is converted from string or other form into a vector (e.g., a set of real numbers) where each value or set of values represents the individual features of the search result candidate or query in feature space. Feature space (or vector space) is a collection of feature vectors that are each oriented or embedded in space based on an aggregate similarity of features of the feature vector. Over various training stages or epochs, certain feature characteristics for each input can be learned or weighted. For example, for a first set of search result candidates, the most prominent feature indicative of referring to an accessory is its condition, whereas other features change considerably or are not present, such as price. Consequently, patterns of condition can be weighted (e.g., a node connection is strengthened to a value close to 1), which is indicative of the label taking on this feature. In this way, embodiments learn weights corresponding to different features such that similar features found in inputs contribute positively for predictions.

The system 100 also includes a presentation component 111 that is generally responsible for causing presentation of content and related information to user devices, such as a search result page based on the functionality of the search result ranker 107 or any result page based on the functionality of the query/search result semantic relationship mapper 103, the accessory/sub-accessory relationship mapper 105, and/or the accessory/sub-accessory determiner 109. The presentation component 111 may comprise one or more applications or services on a user device, across multiple user devices, or in the cloud. For example, in one embodiment, presentation component 111 manages the presentation of content to a user across multiple user devices associated with that user. Based on content logic, device features, associated logical hubs, inferred logical location of the user, and/or other user data, presentation component may determine on which user device(s) content is presented, as well as the context of the presentation, such as how (or in what format and how much content, which can be dependent on the user device or context) it is presented and/or when it is presented.

In some embodiments, the presentation component 111 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, the presentation component 111 generates structured data, tagged data or otherwise causes presentation of structured or tagged data that was previously unstructured, semi-structured, or untagged. For example, in some embodiments the presentation component 111 causes presentation of NER and/or POS tags, as described with respect to the query/search result semantic relationship mapper 103, which may have been previously unstructured or otherwise been in a different form (e.g., existed only in natural language form) than the output provided by the presentation component 111. In this way, some embodiments convert input data to an output that is different than the input.

Example system 100 also includes storage 125. Storage 125 generally stores information including data, computer instructions (e.g., software program instructions, routines, or services), data structures (e.g., network graphs, NLP libraries), training data, historical queries and/or search result candidates, and/or models used in embodiments of the technologies described herein. Some embodiments of storage 225 may have stored thereon computer logic comprising the rules, conditions, associations, classification models, and other criteria to execute the functionality of any of the components, modules, analyzers, generators, and/or engines of systems 100.

Figure 2:
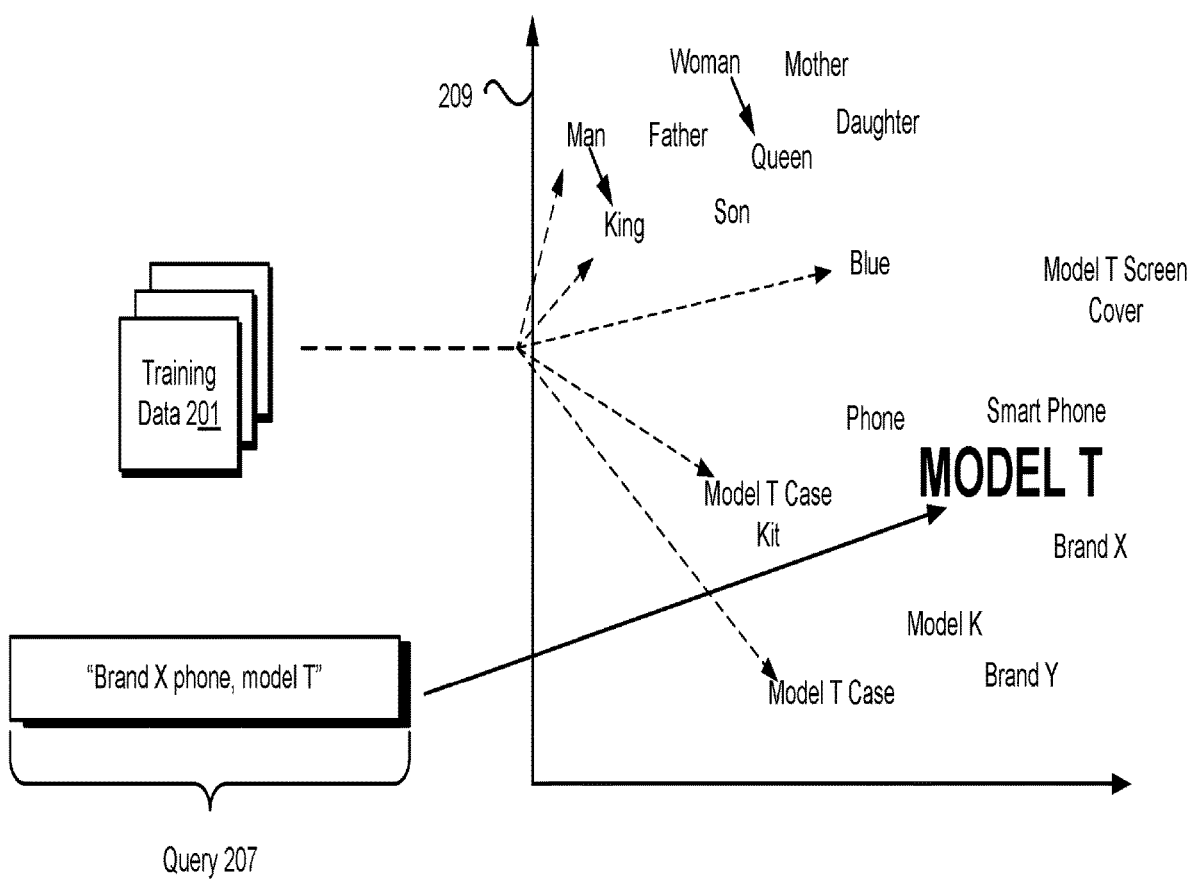
FIG. 2 is a schematic diagram illustrating how vectors associated with words are run through a word embedding vector model that outputs a word embedding, according to some embodiments

FIG. 2 is a schematic diagram illustrating how vectors associated with words are run through a word embedding vector model that outputs a word embedding, according to some embodiments. In some embodiments, functionality described with respect to FIG. 2 is performed by the query/search result semantic relationship mapper 103 as described herein. The vector space 209 includes multiple vectors (e.g., "Model X," "Brand X" etc.) illustrated in natural language text for convenience but are typically represented as vectors. It is understood that the vector space 209 is representative only and that any suitable vectors according to a particular application can be represented.

In some embodiments, the word embedding vector model is a Word2vec model. A word2vec model is a two-layer network model that runs one or more input vectors (e.g., which represent a message element) through a hidden layer (i.e., a column-row matrix) and a projection layer (e.g., a softmax classifier). Word2vec models predict target strings from source context words (i.e., via the Continuous Bag of Words (CBOW) algorithm) or inversely predict source-context words from target words (i.e., via the skip-gram algorithm). In embodiments, when words are processed through a corresponding Word2vec or other word embedding model, the words are numerically represented in a word embedding that shows associated vectors and the distances from the string representations to each of those vectors, which is described in more detail below.

In order to plot data points or vectors within the vector space 209, the model is trained using training data (e.g., the training data 206). In various embodiments, the training data includes a large corpus of unstructured data semi-structured, and/or structured data (e.g., various words of historical queries and/or search result candidates, such as item titles). The training data 201 is also an input of the word embedding. The training data includes some or each of the words as found within the vector space 209—man, king, model T case, etc.

In some embodiments, the vector space 209 represents a "pre-trained" embedding. A pre-trained embedding is a static model that is generated without feedback, retraining, or reference to the data sets being fed through it. For example, a user may download a static word embedding from an online source, which is already trained and includes the vectors or data points already mapped in vector space according to semantic similarity between words. In other embodiments, the vector space 209 represents a "retrained" or trained embedding. A retrained or trained word embedding receives training feedback after it has received initial training session(s) and is optimized or generated for a specific data set (e.g., for historical query/title pairs).

In order to map each of the words to its contextually appropriate points in the vector space 209, training algorithms are utilized. For example, in some embodiments, the word embedding vector model is trained using the maximum likelihood (ML) principle to maximize probability of the next word $w_t$ (i.e., "target") given the previous words h (i.e., "history") in terms of a softmax function:

$$P(w_t \mid h) = \text{softmax}(\text{score}(w_t, h)) = \frac{\exp\{\text{score}(w_t, h)\}}{\sum \text{word } w' \text{ in } Vocab^{\exp\{\text{score}(w',h)\}}}$$

Where score ($w_t$, h) computes the compatibility of word $w_t$ with the context h. The model is trained by maximizing its log-likelihood on the training set, that is maximizing $$J_{ML} = \log P(w_t \mid h) = \text{score}(w_t, h) - \log\left(\frac{\exp\{\text{score}(w', h)\}}{\sum \text{Word } w' \text{ in } Vocab}\right)$$

This yields a properly normalized probabilistic model for language modeling. Each probability is computed and normalized using the score for all other words w' in the current context h at every training step. In some embodiments, some models, such as word2vec, are trained using a binary classification objective, such as logistic regression, to discriminate the real target words $w_t$ from K noise words w", in the same context. Accordingly, instead of a softmax classifier, a noise classifier is used.

The output of the training algorithms and/or actual data input is each of the positional words in the vector space 209, which shows groupings of words that are similar (e.g., semantically similar). "Semantic similarity" is the semantic distance between two or more concepts (e.g., vectors representing query and/or search result words). The "distance" between any two or more words in some embodiments is based on the similarity of their meaning and/or semantic content, as opposed to any syntax similarity.

In some embodiments, the output as represented in the vector space 209 is computed based on a word embedding vector model computing semantic similarity between words. For example, a vocabulary set (e.g., all the words in the vector space 209) may first be converted into input vectors via an input vector encoding (e.g., one hot encoding). For example, the words "model T Case" may be converted into the vector [1,0,0,0,0]. This vector representation shows five dimensions, where each value corresponds to ordered words (e.g., each word in a set of trained queries and titles) and whether the word is TRUE or present. Because "model T case" are the only words being run through the word embedding model in this example, the integer 1 is used to indicate its representation. "model T case" does not contain any of the other words within it (e.g., "blue") so the other values are represented as 0. In some embodiments, based on generating the softmax function above or the output layer of the neural network, an output embedding vector representation can be generated, which is indicative of the actual coordinates that a vector will be plotted in vector space 209 based on semantic similarity to other words and/or averaging or otherwise combining the output embedding vectors for all of the words within the message vectors 400. For example, using the illustration above, the "model T case" vector [1,0,0,0,0] can be converted to an output layer vector [1,2], which is the 2-dimensional plotting coordinates in vector space 209.

The distance between any two vectors or words is measured according to any suitable method. For example, in some embodiments, automated cosine similarity is used to compute distance. Cosine similarity is a measure of similarity between two non-zero vectors of an inner product space that measures the cosine of the angle between the two non-zero vectors. In these embodiments, no similarity is expressed as a 90 degree angle, while total similarity (i.e., the same word) of 1 is a 0 degree angle. For example, a 0.98 distance between two words reflects a very high semantic similarity while a 0.003 distance reflects little semantic similarity. As illustrated in the vector space 500-1, for example, the cosine similarity between "man" and "king" and "woman" and "king" are the same cosine distance, thus "king" in certain situations is semantically similar to "king" given the different input of "man" and "woman" are used. In some embodiments, the distance is represented as an average distance or the distance between a particular vector in vector space 209 and an average of query terms. In some embodiments, the distance is represented via fuzzy matching.

In some embodiments, FIG. 2 represents or includes a word-category co-occurrence matrix (e.g., a compilation of vector spaces). A matrix includes one or more vectors of a first vector space multiplied by one or more vectors of a second vector space (e.g., multiplying each word in a query and/or search result candidate to get a final distance). This allows rows within the vector space to be normalized for summing to 1 to become a probability distribution. Words or vectors can be compared using their category distribution. In some embodiments, each vector representing a word in a query and/or search result candidate (e.g., an item title) is combined or aggregated (e.g., via a dot product operation) with other word in the query and/or search result candidate in order to get an aggregated score or distance any particular query is to another query and/or search result candidate. Likewise, particular distances between search result candidates can be computed.

After the training data is run through the training algorithm, the output is represented in FIG. 2. In some embodiments, the vector space 209 is representative of how a word embedding appears for the query/search result semantic relationship mapper 103 to perform its functionality.

In some embodiments, in response to generating the training data 201 in the vector space 209, a query "BrandX phone model X" 207 is received (e.g., at runtime). In response to receiving this query, particular embodiments (e.g., the query/semantic search result semantic relationship mapper 103) maps each word in the query according to its semantic similarity to other words within the vector space 209, as illustrated in FIG. 2. For example, the query term "model T" can be mapped to its place in feature space 209. As described herein, some embodiments aggregate or combine such mapping (e.g., via a dot product function) with other mappings of the query in order to determine the overall or aggregated distance between the query 207 and search result candidates as indicated in the training data 201.

Figure 3:
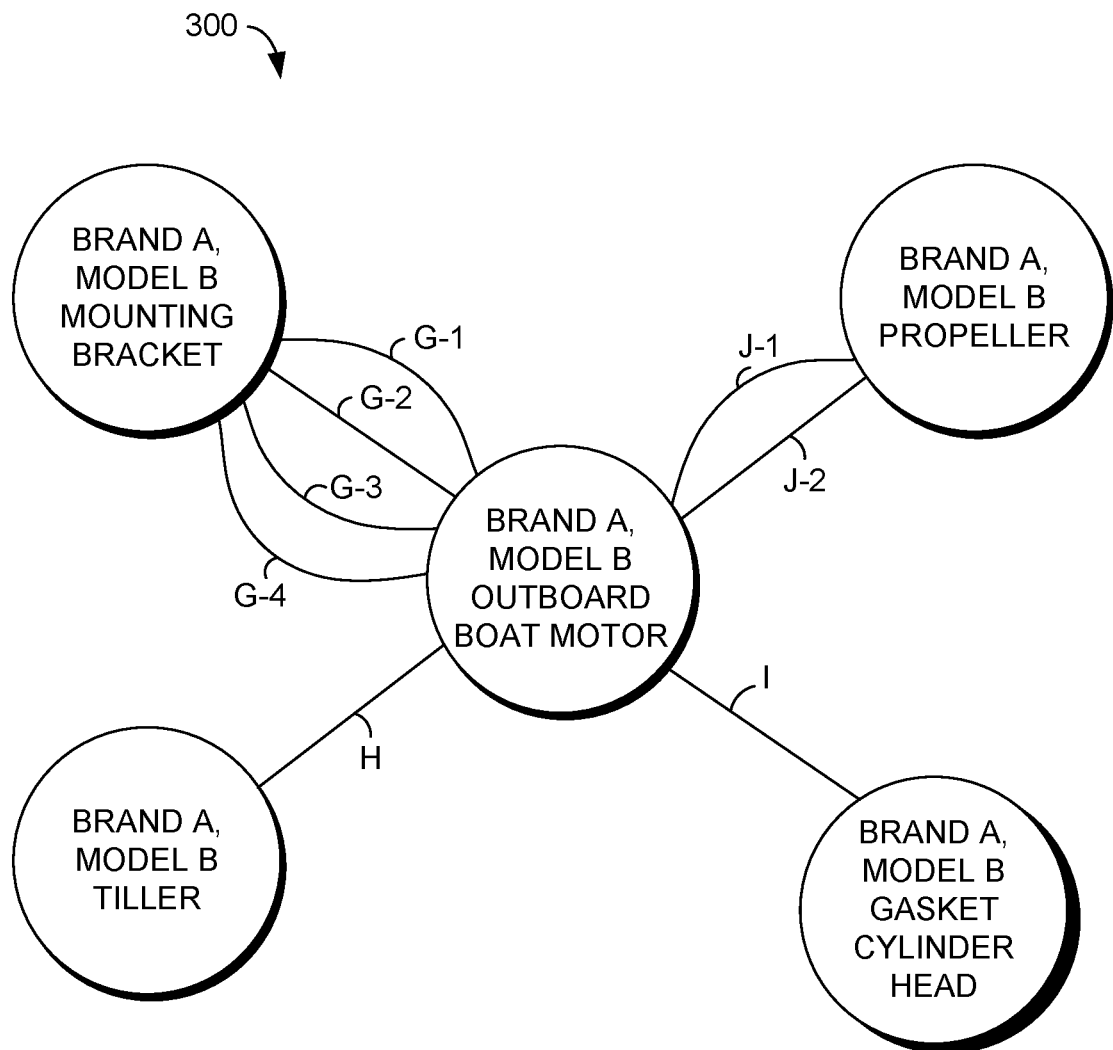
FIG. 3 is a schematic diagram of an example network graph, according to some embodiments.

FIG. 3 is a schematic diagram of an example network graph 300, according to some embodiments. In some embodiments, the network graph 300 represents the object that is used and/or generated by the accessory/sub-accessory relationship mapper 105. A network graph is a pictorial representation or visualization for a set of objects where pairs of objects are connected by links or "edges." The interconnected objects are represented by points termed "vertices," and the links that connect the vertices are called "edges." Each node or vertex represents a particular position in a one-dimensional, two-dimensional, three-dimensional (or any other dimensions) space. A vertex is a point where one or more edges meet. An edge connects two vertices. Specifically, the network graph 300 (an undirected graph) includes the nodes or vertices of: "brand A, model B outboard motor"," "brand A, model B mounting bracket," "brand A, model B propeller," "brand A, model B tiller," and "brand A, model B gasket cylinder head." The network graph further includes the edges I, H, J-1, J-2, and G-1, G-2, G-3, G-4.

The network graph 300 specifically shows the relationships between the one accessory—the brand A, model B outboard motor—and all of this accessories' sub-accessories—brand A, model B mounting bracket, brand A, model B propeller, brand A, model B tiller, and brand A, model B gasket cylinder head, where the item is a particular boat (e.g., a brand A boat). It is understood that these accessories and sub-accessories are representative only. As such, the accessory may alternatively or additionally be other accessories (e.g., other boat or car parts, phone parts, etc.).

The network graph 300 represents or illustrates the specific relationship between the particular brand A, model B outboard motor accessory and all of its sub-accessories. In some embodiments the quantity of edges (and/or thickness of the edges) represents the confidence level or strength of relationship between an accessory and a given sub-accessory. For example, between the nodes representing brand A, model B mounting bracket and bran A, model B outboard motor, there are 4 edges (i.e., G-1, G-2, G-3, an G-4) representing the highest strength of relationship between any two given nodes, whereas all the other nodes only have 1 or 2 edges connecting each other, which indicates a relatively lower strength relationship. Such strength of relationship or number of edges may be determined via training or other processes where the same sub-accessory has been identified as a sub-accessory to a particular accessory. For example, there may be a one-to-one correspondence between the number of edges present in the network graph 300 and the amount of times a user or other entity has indicated (e.g., within an item title description) that a particular component (e.g., the brand A, model B mounting bracket) is a sub-accessory to a particular accessory (e.g., the brand A, model B outboard motor). Accordingly, for example, this indication has occurred more between the nodes representing the brand A, model B mounting bracket and brand A, model B outboard motor than any other sub-accessory.

In various embodiments, the network graph 300 is used to determine if a search result candidate of a query (and/or query itself) is indicative of a sub-accessory to an accessory (or an accessory itself). For example, some embodiments map one or more terms in a query (or search result candidate) (or semantically related term) to its node within the network graph 300. Responsively, these embodiments determine if one or more of these terms refer to a sub-accessory or accessory based on the relationships indicated in the graph 300.

Some embodiments traverse the graph 300 by matching an accessory and/or sub-accessory term in the query (or search result candidate) to a node (e.g., brand A, model B outboard motor) in the network graph 300 and responsively selecting every node within N distance relative to the node. In some embodiments, a "distance" in terms of network graphs corresponds to a number of edges (or edge sets) in a shortest path between vertex U and vertex V. In some embodiments, if there are multipole paths connecting two vertices, then the shortest path is considered as the distance between two vertices. Accordingly, distance can be defined as d(U,V). For instance, the distance between user brand A, model B mounting bracket and brand A, model B outboard motor is 1 (e.g., because there is only 1 edge set G-1 through G-4), the distance between brand A, model B mounting bracket and brand A, model B propeller (and brand A, model B tiller) is 2.

Some embodiments alternatively or additionally select nodes or traverse the graph 300 by selecting N nodes nearest to the "centroid" of at least a portion of nodes in the network graph 300. A "centroid" in some embodiments refers to the geometric center of a set of objects (e.g., a mean position of the nodes in the network graph 300). For example, if both brand A, model B gasket cylinder head node and brand A, model B propeller were indicated in a query and/or search result candidate (and not the other nodes), the mean position may be the middle node—brand A, model B outboard motor. One or more network graph rules may specify to only select nodes that are within a threshold distance of the centroid.

Figure 4:
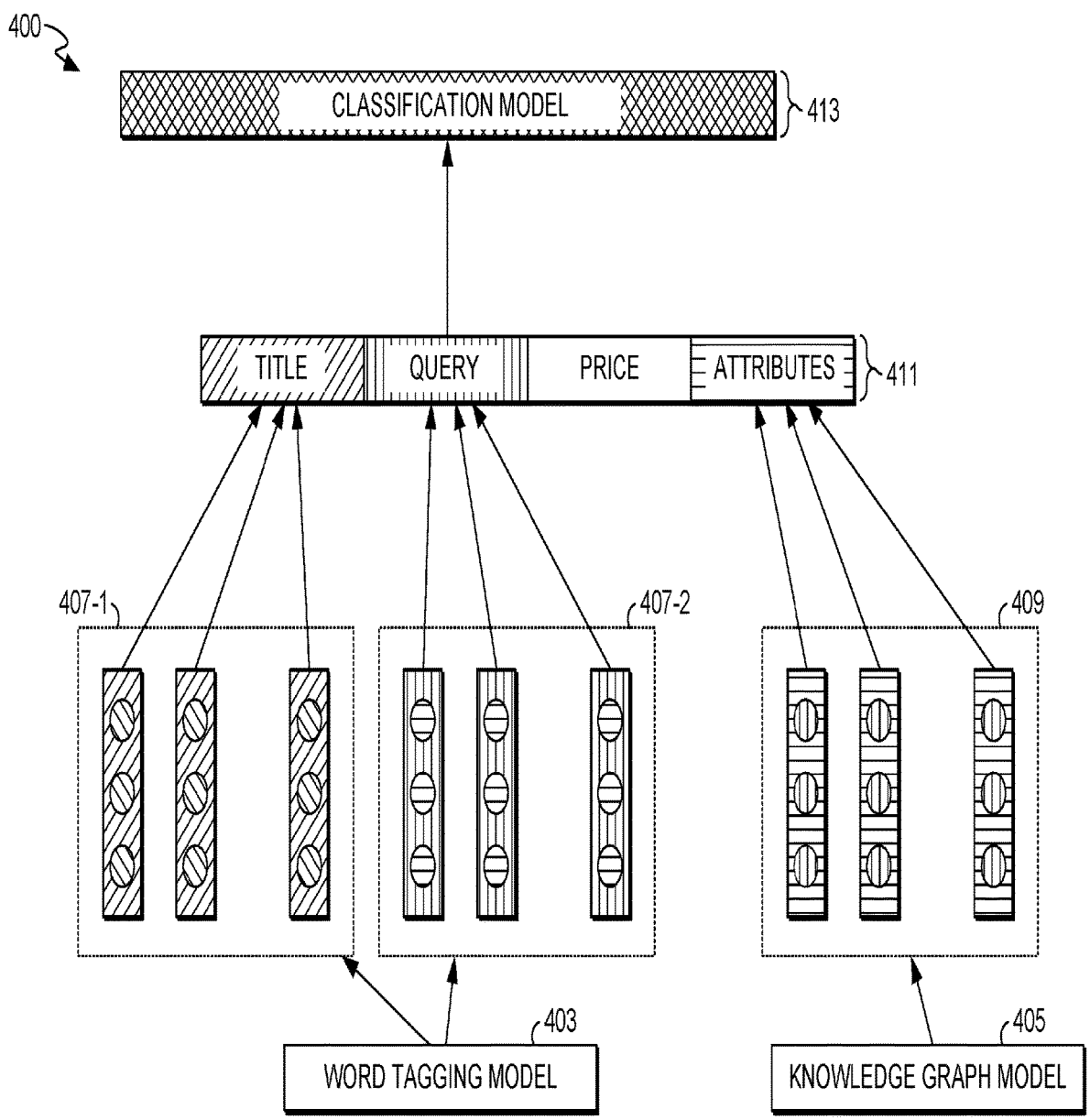
FIG. 4 is a schematic diagram illustrating a classification prediction of whether one or more search result candidates and one or more queries are indicative of a sub-accessory to an accessory and/or are indicative of the accessory itself, according to some embodiments.

FIG. 4 is a schematic diagram 400 illustrating a classification prediction of whether one or more search result candidates (and one or more queries) are indicative of a sub-accessory to an accessory and/or are indicative of the accessory itself, according to some embodiments. FIG. 4 illustrated a machine-learned classifier for detecting "part-of-part" items. The classifier builds a vector-based machine learned model using price, query, title, condition, and/or aspect features. Embodiments of FIG. 4 encode query, title, and aspect features into a text or word embedding and add price features, as described in more detail below.

The word tagging model 403 is generally responsible for converting one or more queries and/or item titles (or other search result candidates) from natural language sequences and symbols into vectors (or "tokens") and embedding them in vector space 407 (which includes respective sub-vector spaces 407-1 and 407-2). In some embodiments, the word tagging model 403 and the associated vector embedding 407 represents functionality as performed by the query/search result semantic relationship mapper 103 and/or a word embedding vector model, as described with respect to FIG. 1 and FIG. 2 respectively. For example, in some embodiments, the word tagging model 403 represents a NER tagging model, as described with respect to the query/search result semantic relationship mapper 103. In some embodiments, the embedding 407 represents the feature space 209 as described with respect to FIG. 2.

In some embodiments, the inputs to the word tagging model 403 is a set of training data, such as query/title pairs or other historical queries and search result candidates that are oriented in vector space via training. Such inputs may be fed into the word tagging model 403 offline, as described herein. Alternatively or additionally, in some embodiments, the inputs into the word tagging model 403 is one or more runtime queries that are mapped to the vector space 407-1 in response to being received (e.g., from a user computing device).

In some embodiments, as illustrated in FIG. 4, each query received is converted into a corresponding vector and mapped in the sub-space 407-1. Likewise, each item title or search result candidate is mapped into the sub-space 407-2. In this way, vector space (e.g., the vector space 209), in some embodiments, is made up entirely of either embedded queries or search result candidates (but not both). However, in some embodiments, vector space (e.g., the vector space 209) includes both types of vectors representing queries and search result candidates.

The knowledge graph model 405 is generally responsible for converting one or more nodes and/or edges representing in a knowledge graph from natural language sequences or symbols into vectors (or "tokens") and embedding them in vector space 409. In some embodiments, the knowledge graph model 405 and the associated vector space embedding 409 represents functionality as performed by the accessory/sub-accessory relationship mapper 105. In some embodiments, the knowledge graph model 405 takes as input, a knowledge graph, such as the knowledge graph 300 as described with respect to FIG. 3, and converts the knowledge graph into one or more vectors, as described herein.

The output of the word tagging model 403 and the knowledge graph model 405 is a combined or aggregated set of vectors 411 in vector space, which indicate one or more queries, titles, the "price" indicated in such query and/or title, and attributes from the embedding 409. In some embodiments, each feature (i.e., "title," "query," "price," and "attributes") of the aggregated set of vectors 411 represents different nodes and/or layers within a neural network. In response to generating the aggregated set of vectors 411, the classification model 413 uses the aggregates set of vectors 411 as input in order to classify whether the corresponding one or more item titles (or search result candidates) and associated queries refer to an "accessory" or a "sub-accessory." In this way, the particular classification prediction can be based on a combination of results from the word tagging model 405, knowledge graph model 405, price, and/or other attribute (e.g., a condition of an accessory (e.g., whether it is new or not), and aspect features of the accessory). Some embodiments weight particular features or attributes higher relative to others (e.g., based on training, as described herein). For example, after several epochs or rounds of training by the classification model 413, it may be determined that the explicit accessory/sub-accessory mapping between accessories and sub-accessories as defined in a knowledge graph (i.e., as generated by the knowledge graph model 405) contains a lower error rate or higher accuracy of classification relative to using a word embedding alone (i.e., as generated by the word tagging model 403) or other features, such as price, condition, etc. Accordingly, for example, the classification model 413 would weight nodes corresponding to the embedding 409 higher than other inputs.

In some embodiments, the classification model 413 performs its functionality or makes these classifications as described with respect to the accessory/sub-accessory determiner 109 of FIG. 1. In some embodiments, other machine learning models are alternatively or additionally used, such as a clustering machine learning model or a regression model, as described herein.

Figure 5:
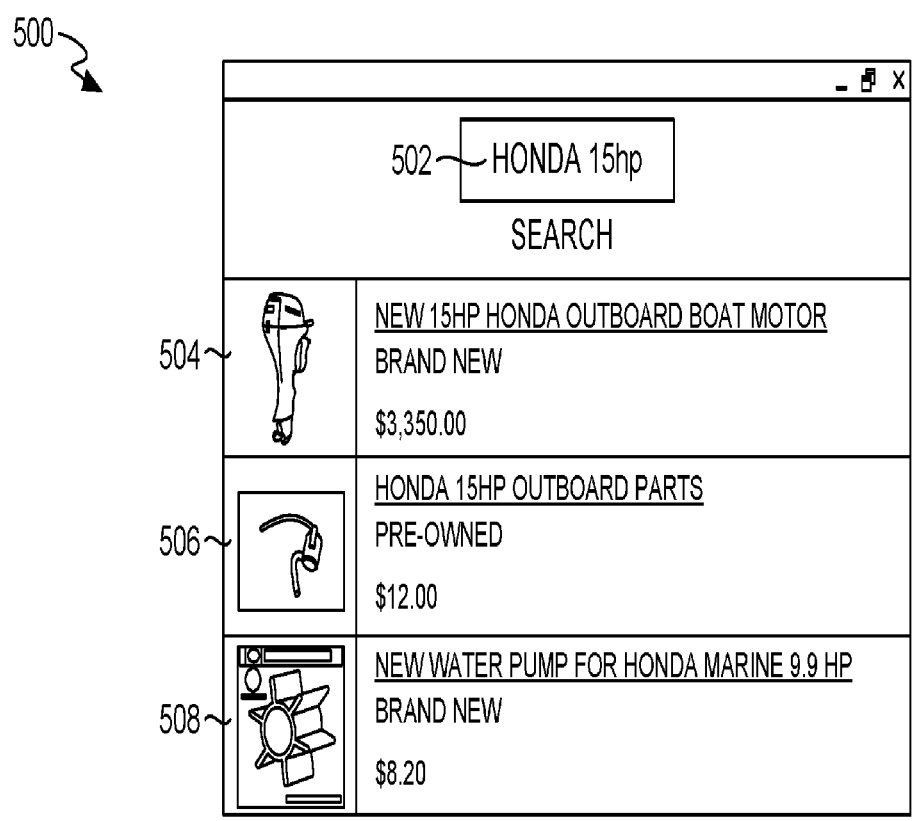
FIG. 5 is a screenshot of an example user interface search result page that is generated in response to a query, according to some embodiments.

FIG. 5 is a screenshot 500 of an example user interface search result page that is generated in response to a query, according to some embodiments. In some embodiments, the screenshot 500 is rendered by the presentation component 111, as described with respect to FIG. 1. In some embodiments, the screenshot 500 is rendered in response to the functionality as described with respect to the classification model 413 of FIG. 4 and/or the search result ranker 107 of FIG. 1.

As illustrated in FIG. 5, a user inputs a query "HONDA 15 HP" into the search field. In response to receiving such query, various embodiments as described herein generate semantic relationships between the query and search result candidates (and/or other queries via the query/search result semantic relationship mapper 103). For example, embodiments may map "15 HP" to "horse power" and "Honda boat motor." In another example, embodiments additionally or alternatively determine specific accessory/sub-accessory relationships between words associated with the query and/or search result candidates. For example, particular embodiments can map the semantically tagged "Honda boat motor" and "15 horse power" to a corresponding "accessory" node in a knowledge graph (e.g., via the accessory/sub-accessory relationship mapper 105), where the knowledge graph also lists sub-accessories to the Honda 15 horse power boat motor, such as "Honda_water_pump_impeller" and "Honda 15 horse power tiller." Additionally or alternatively, embodiments can classify or otherwise determine (e.g., via the accessory/sub-accessory determiner 109) whether the search result candidates (and/or the query "HONDA 15 hp) refers to a "Honda boat motor" (i.e., the "accessory") and/or a sub-accessory to the HONDA boat motor (e.g., tiller or impeller) by using determinations made by the query/search result semantic relationship mapper 103, the accessory/sub-accessory relationship mapper 105, and/or other attributes such as the price indicated in the query and/or search result candidate, a condition (e.g., new or used) indicated in the query and/or search result candidate, and/or other aspect features. Various embodiments can then use this to rank search result candidates for the query (e.g., via the search result ranker 107)

Responsively, the presentation component 111 can cause presentation of the search result page that indicates the ranking. Specifically, the search result candidate 504 (an item listing), which indicates an actual 15 HP Honda boat motor accessory is ranked in a highest position, whereas the lower position sub-accessory search results candidates 506 and 508 indicated they are ranked lower relative to the search result candidate 504. This is because the query "HONDA 15 HP" is requesting listings for a HONDA15 horse power boat motor (i.e., an accessory) and not any parts to the HONDA 15 horse power boat motor, such as a tiller or pump impeller (i.e., the sub-accessory). As described herein, existing technologies rank search result candidate 508 higher than search result candidate 504 in some cases, even though the accessory (and not the sub-accessory) is indicated in the query (and vice versa). However, the screenshot 100 indicates the improvement over these technologies.

Figure 6:
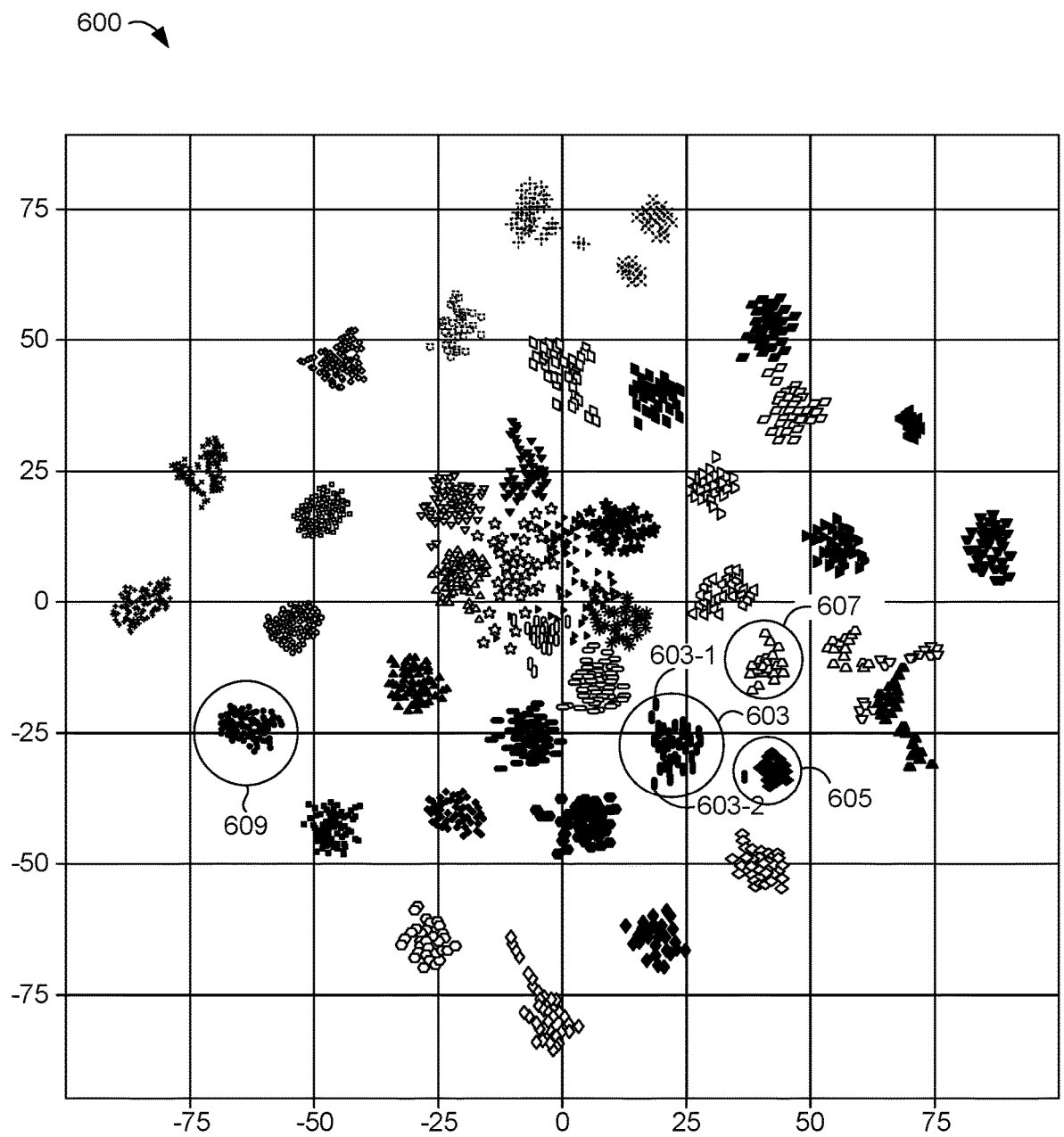
FIG. 6 is a schematic diagram of an example visualization of vector space that illustrates various feature vectors representing one or more queries and/or search result candidates, according to some embodiments.

FIG. 6 is a schematic diagram of an example visualization of vector space 600 that illustrates various feature vectors representing one or more queries and/or search result candidates, according to some embodiments. In some embodiments, the feature space 600 represents the functionality produced (or used) by the accessory/sub-accessory determiner 109 to determine what class (or cluster) a particular feature vector belongs to (e.g., whether the feature vector is classified as an "accessory" or "sub-accessory." In some embodiments, the vector space 600 represents any vector space described herein.

In some embodiments, the vector space 600 includes classes of data points (e.g., data point 603-1 and data point 603-2) representing individual feature vectors corresponding to specific queries and/or search result candidates. These data points are formed together to form a particular class (or cluster). For example, the data point 603-1 and data point 603-2 may have been classified as "HONDA 15 horse power boat motor" 603 (indicative that the feature values of the data points 603 are within a threshold distance to or similar to other trained data points). There are other classes, such as class 605 (e.g., "HONDA 40 horse power boat motor") and the class 1107 (e.g., "HONDA model Y car engine.").

In an illustrative example of how the feature space 600 is used, embodiments may receive a query in order to classify whether the query is referring to an accessory or sub-accessory. Responsively, some embodiments run the query through one or more machine learning models in order to weight features for the query, after which a feature vector (e.g., representing the data point 603-1) is embedded in the feature space 600. The feature space 600 in various embodiments represents a multidimensional coordinate system where each feature is associated with one or more dimensions. For example, a first set of values in a vector may represent outputs from the word tagging model 402, where a first axis represents the first set of values and a second axis represents a second set of values of the same vector, which is the output of the knowledge graph model 405. Each feature value within the feature vector may be summed or otherwise aggregated to arrive at a final coordinate point (e.g., the data point 603-2) within the feature space 600. Each of the data points within the class 603, for example, are within a feature similarity threshold and so they are close to each other (e.g., based on Euclidian distance) in the feature space 600. Responsive to the embedding of the feature vector in the feature space 600, embodiments classify the vectors. For example, if a first vector represents data point 603-1, then the classification that is nearest to the data point 603-1 is the "HONDA 15 horse power motor" Classification 603 indicative of the query and/or search result candidate referring to this accessory.

The machine learning model(s) are able to cluster samples of new unseen queries (e.g., any query received after training). In some embodiments, query and/or search result candidate is represented by the median of its samples' embeddings as shown below:

$$C = \text{median}\{f_{embed}(S_i^j): I=1,2,\ldots,n\}$$

Where $f_{embed}$ is the output of the model, $S_i^j$ is the $i^{th}$ sample of the $j^{th}$ class. The prediction for any test sample X is given by:

$$Pred(X) = \arg\min_j \|C_j - f_{embed}(X)\|.$$

However, it is understood that median is just one way to represent an embedding. Some embodiments alternatively use other statistics like mean, pth percentile, and the like.

Figure 7:
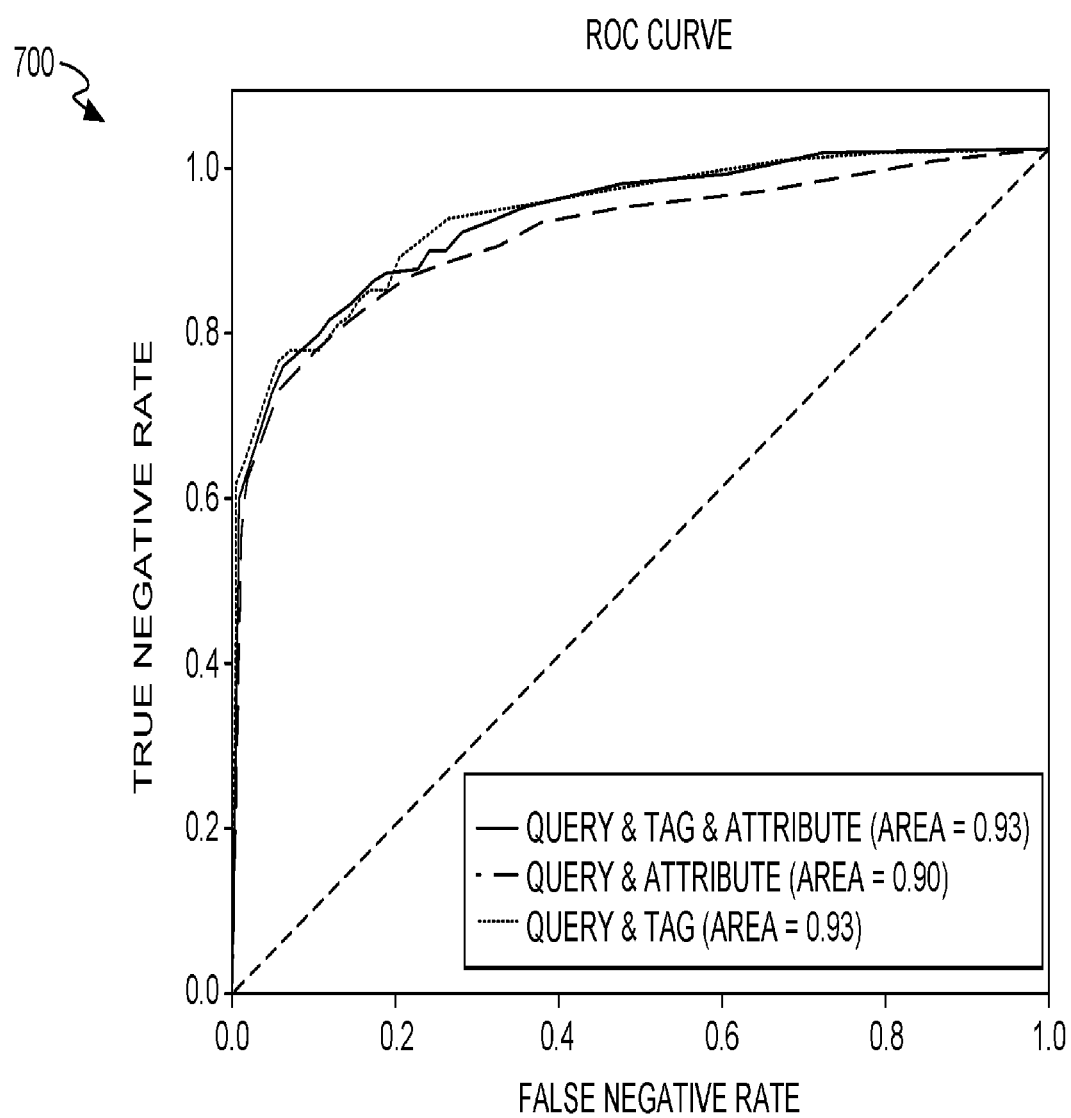
FIG. 7 is a graph that illustrates experimental data that indicates classification accuracy improvements for ranking search results, relative to other existing technologies by using various aspects as described herein, according to some embodiments.

FIG. 7 is a graph 700 that illustrates experimental data that indicates classification accuracy improvements for ranking search results, relative to other existing technologies by using various aspects as described herein, according to some embodiments.

In the experiment, a classifier was built (e.g., the classification model 413). Twenty-seven million queries were used that indicate accessories or sub-accessories. Likewise, fourteen million item titles were used (with POS labelling). Twenty-five million attributes of item listings were used to build three embeddings (e.g., the embedding 404-1, 407-2 and 409). These three embeddings were combined with price features (e.g., as indicated in FIG. 4) as the model features to be used as input into the classifier. An NER tagging model (e.g., the word tagging model 403) as well as a knowledge graph model (e.g., the knowledge graph model 405) that indicates various accessory/sub-accessory relationships as found in a WIKIPEDIA repository produced outputs, were used as inputs into the classifier.

In these experiments, seven hundred labeled data (i.e., query and title pairs) were used in a supervised machine learning context. Specifically, four thousand, eight hundred labeled data was used for training and two thousand, two hundred labeled data was used as test data to build a Gradient Boosted Decision Trees (GBDT) classifier machine learning model.

FIG. 7 illustrates the results of the experiments. The graph 500, indicates that the features provided as input (e.g., knowledge graph information, semantic relationship information, and price) to the classifier provided great performance for the test set for getting a Receiver Operating Characteristic (ROC) curve with precision of around 92% and Recall of around 89%.

Figure 8:
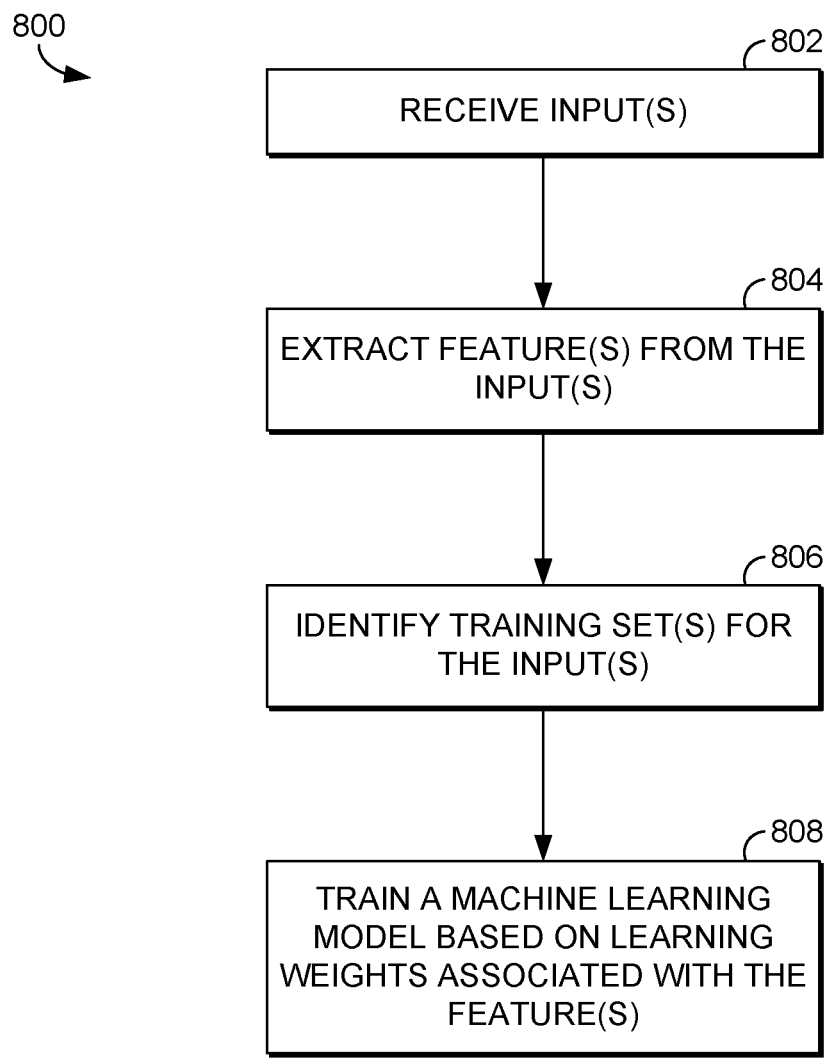
FIG. 8 is a flow diagram of an example process for training a machine learning model, according to some embodiments.

FIG. 8 is a flow diagram of an example process 800 for training a machine learning model, according to some embodiments. In some embodiments, the process 800 is performed to train the classification model 413 of FIG. 4. Alternatively or additionally, in some embodiments, the process 800 is used to train a word embedding, such as the vector space 209 of FIG. 2, and/or the vector space 600 of FIG. 6.

The process 800 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 11). The computer-implemented method, the system (that includes at least one computing device having at least one processor and at least one computer readable storage medium), and/or the computer readable medium as described herein may perform or be caused to perform the process 800 or any other functionality described herein. In some embodiments, the process 800 is performed by the training component (not shown) as described with respect to the accessory/sub-accessory determiner 109.

Per block 802, one or more inputs (e.g., a query, item title, knowledge graph relationships, price, aspect features, condition of item, etc.) are received. In some embodiments, the one or more inputs have been labelled or classified according to features within the inputs prior to training. For example, some embodiments are supervised and may receive a user input label of "accessory" or "sub-accessory" indicative of a query or search result candidate referring to an accessory or sub-accessory. Alternatively, in some embodiments the one or more inputs are not labeled or have no classification prior to training, such as in some unsupervised machine learning contexts.

Per block 804, particular embodiments extract one or more features from each of the one or more inputs. For example, some embodiments extract price attributes, condition attributes, aspect attributes, knowledge graph information, word embedding information, and/or other attributes from queries and item titles.

Per block 806, one or more training sets are identified for the input(s). For example, in a supervised context where inputs are labelled, inputs with the same label are identified in preparation for training. In an illustrative example, pairs of inputs that have the same label can be paired, as well as pairs of inputs that have differing labels can be paired. In unsupervised context where inputs are not labeled, any input can be paired with any other arbitrary or randomly selected other image.

Per block 808, a machine learning model (e.g., a deep learning model) is trained based at least in part on learning weights associated with the extracted features. For example, using the illustration above, a particular "brand A accessory" query may be associated with or contain price Y, condition Z. These weights can be learned for each input to determine which are the most important for being classified as "brand A accessory."

In some embodiments, pairs of same labeled inputs (e.g., two "accessory" inputs) and dissimilar labelled inputs (e.g., one "accessory" input and one "sub-accessory" input) are processed or run through a deep learning model by comparing the associated features and mapping it in feature space. And based at least in part on the processing, weights associated with the deep learning model can be adjusted to indicate the importance of the extracted featured for prediction or classification. In some embodiments, as described herein, the adjusting includes activating, strengthening, or inactivating a neuron or node in a neural network. In some embodiments, the adjusting includes changing an embedding in feature space of a feature vector representing the image feature(s). For example, after a first round or epochs of training, it may be unknown which of the extracted features are important for taking on a certain classification or prediction. Accordingly, each feature may take on equal weight (or close to equal weight within a threshold, such as a 2% changed weight) such that all of the input feature vectors are substantially close or within a distance threshold in feature space. However, after several rounds of training or any threshold quantity of training, these same feature vectors may adjust or change distances from each other based on the feature value similarity. The more features of two feature vectors that match or are within a threshold value, the closer the two feature vectors are to each other, whereas when features do not match or are not within a threshold value, the further away the two feature vectors are from each other. Accordingly, for example, a trained embedding may look similar to the feature space 209 of FIG. 2 of the feature space 600 of FIG. 6.

Figure 9:
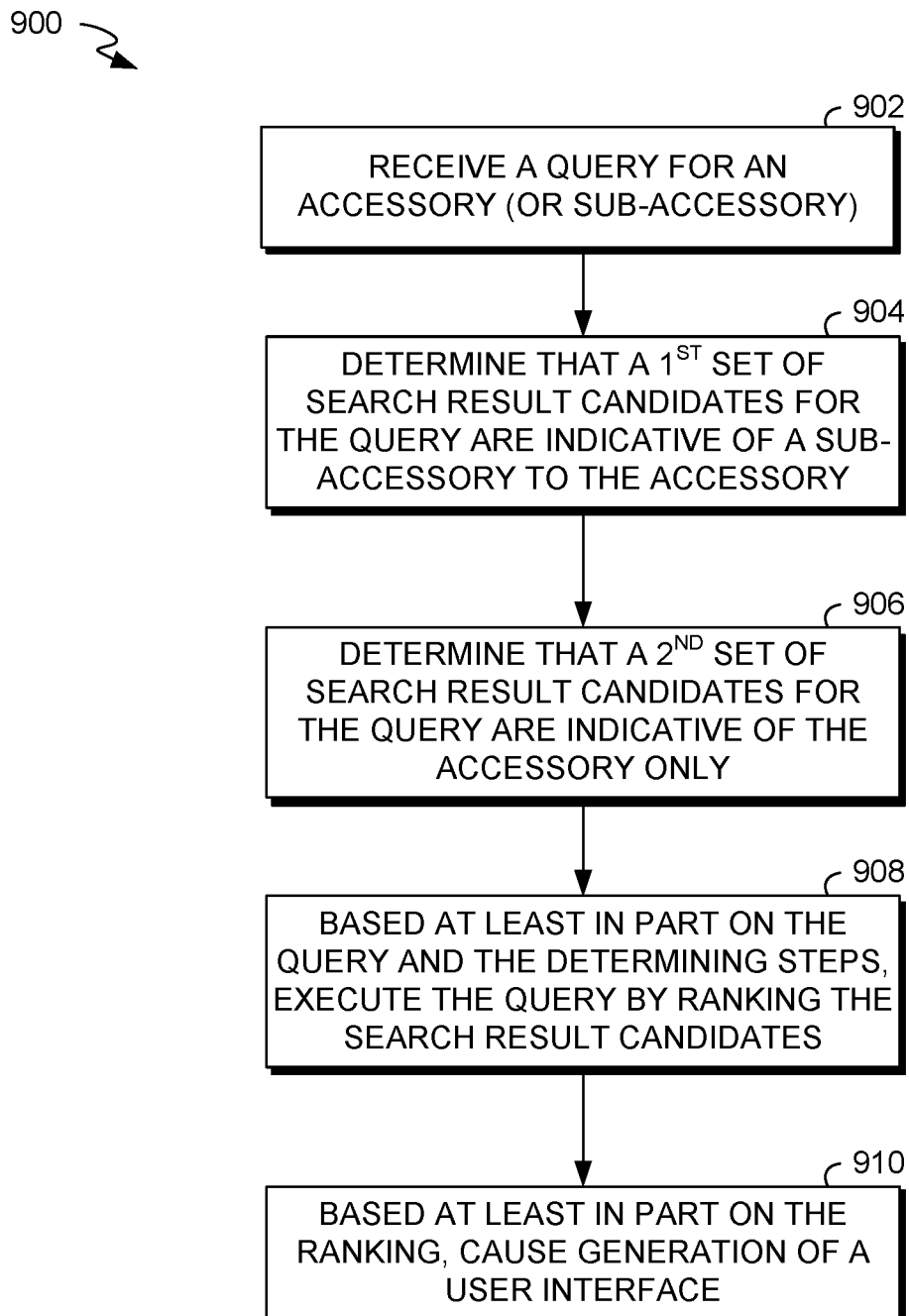
FIG. 9 is a flow diagram of an example process for executing a query by ranking search result candidates, according to some embodiments

FIG. 9 is a flow diagram of an example process 900 for executing a query by ranking search result candidates, according to some embodiments. In some embodiments, the process 900 occurs after the training as indicated in the process 800 of FIG. 8. Per block 902 a query for an accessory or sub-accessory is received. For example, referring back to FIG. 5, the query "HONDA 15 HP" is received in response to a user input into the search field 502.

In some embodiments, the query is for an accessory of an item where the accessory is for sale in an electronic marketplace. The accessory is a first component associated with the item. In some embodiments, the accessory is a part of the item. For example, using the illustration above the query "HONDA 15 HP" is for a boat motor accessory, which is a part of a larger boat item. In some embodiments, such "part" is a first attachable component that makes up a portion of the item. For example, the HONDA 15 horse power motor is attachable to, via a motor mount, to a transom of a boat.

In some embodiments, the accessory is a supplemental component associated with the item. The supplemental component may be for use in conjunction with the item as a complimentary good. For example, the query can be for a phone case, which is to be used with or supplemented with a phone item (but is not necessarily a component part of the phone).

In some embodiments, the query is for a sub-accessory of an accessory, where the sub-accessory is for sale in an electronic marketplace. The sub-accessory is a component associated with the accessory. In some embodiments, the sub-accessory is a sub-part of the accessory. For example, using the illustration above, the sub-accessory can be a gasket cylinder head, which is apart of the 15 horse power HONDA motor—the accessory. In some embodiments, the sub-part is a second attachable component that makes up a portion of the accessory and the second attachable component is smaller in size relative to the first attachable component. For example, using the illustration above, the gasket cylinder head sub-accessory makes up a portion of the HONDA motor accessory and is smaller in size relative to the HONDA motor accessory.

In some embodiments, the sub-accessory is a second supplemental component of the accessory. For example, example, using the phone item example above, the second supplemental component can be a tool that comes with the phone case.

Per block 904, particular embodiments determine that a first set of search result candidates for the query are indicative of a sub-accessory to the accessory. Some embodiments perform block 904 based at least in part on using a word embedding model to determine one or more semantic relationships between the query and a plurality of search result candidates, where the plurality of search result candidates include the first set of search result candidates and a second set of search result candidates. Examples of this functionality is described with respect to the query/search result semantic relationship matter 103, the feature space and related functionality as described with respect to FIG. 2, and the word tagging model 403 of FIG. 4.

Some embodiments additionally or alternatively perform block 904 based at least in part on using a knowledge graph that indicates relationships between a plurality of accessories and a plurality of sub-accessories. Examples of this are described with respect to the accessory/sub-accessory relationship mapper 105, the knowledge graph 300 of FIG. 3, and the knowledge graph model 405 of FIG. 4.

Some embodiments additionally or alternatively perform block 904 based at last in part on using a classifier machine learning model that uses historical query features, historical title features, and/or knowledge graph information associated with the accessory as inputs to predict that the first set of search result candidates refer to the sub-accessory. Examples of this functionality is described with respect to the accessory/sub-accessory determiner 109, the feature space 600 of FIG. 6, and the classification model 413 of FIG. 4. In some embodiments, "historical" query and title features refers to query and item titles (e.g., query/title pairs) that have been trained (e.g., via the process 800) or otherwise analyzed offline, as described herein.

Some embodiments additionally or alternatively perform block 904 based at least in part on using a machine learning model that uses at least one of: a condition of the accessory (and/or sub-accessory), a price of the accessory (and/or sub-accessory), and aspect features of the accessory (and/or sub-accessory) as input. Examples of this functionality is described with respect to the accessory/sub-accessory determiner 109, the feature space 600 of FIG. 6, and the classification model 413 of FIG. 4.

A "condition" of an accessory or sub-accessory typically indicates how much wear the accessory or sub-accessory has experienced. For example, "new" indicates that little to no wear has occurred. "Used" indicates more wear relative to "new." Other identifiers may state "good condition," "moderate condition," or "poor condition." Other examples of condition include "manufacturer refurb." A condition term in a query or search result candidate can be highly indicative of whether such term is referring to an accessory or sub-accessory. For example, it may be the case (e.g., in training) that hardly any queries or search result candidates that were labeled as "sub-accessories" included the word "used," or any other condition marker. It may be the case that most sub-accessories are always new or do not have related terms in related queries or search result candidates. Accordingly, a classifier or other determinations made at block 904 can be made based on this.

In some instances, price is also highly indicative of whether query or search result candidate terms are referring to accessories or sub-accessories. For example, if an item title reads "HONDA 15 HP $10," embodiments can infer that this is likely referring to a particular sub-accessory even though the title appears to refer to a HONDA motor engine itself (an accessory) or is not explicit in its request for a sub-accessory. For example, it may be the case (e.g., in training) that most search result candidates or queries labeled as "HONDA boat motor" were sold at a price between $200 and $15,000. Accordingly, embodiments can weight the probability of this phrase less likely referring to the HONDA motor accessory. Likewise, it may also be the case the most search result candidates labeled as "HONDA boat motor propeller" (a sub-accessory) are between $10-15. Accordingly, embodiments can weight the probability of this item title more likely to be referring to the propeller sub-accessory. It may be the case that most sub-accessories are always new or do not have related terms in related queries or search result candidates.

"Aspect" features as described herein refer to any suitable attribute of a query and/or search result candidate that implicitly or explicitly defines or indicates relationships between an accessory and/or sub-accessory. For example, an aspect feature may be the explicit recitation of "part" or "accessory" indicated in the query or search result candidate indicating that it is referring to an accessory (and not a sub-accessory). Another "explicit" example is an image or photograph (e.g., within an item title listing), which may explicitly be a representation of an accessory or sub-accessory. In these embodiments, there may be object detection or image recognition (e.g. via a CNN) of objects within such images. For example, embodiments can generate a bounding box over an accessory in an image along with a classification of "HONDA 15 horse power motor tiller."

Implicit examples include terms such as VIN numbers, since accessories may have VIN numbers but sub-accessories may not. Other examples include such phrases as "replacement of," which may be more indicative of a sub-accessory relative to an accessory.

In some embodiments one or more of the condition, price, and aspect features are extracted (e.g., by the accessory/sub-accessory determiner 109), in natural language form, from search result candidates and/or queries (e.g., during training or runtime) and converted to corresponding vectors to be embedded in vector space (e.g., the vector space 407-1 and 407-2) so that they can be used as inputs to the machine learning model(s).

Per block 906, particular embodiments determine that the second set of search result candidates for the query are indicative of the accessory only (and not the sub-accessory). Examples of block 906 is described with respect to the accessory/sub-accessory determiner 109, the feature space 600 of FIG. 6, and the classification model 413 of FIG. 4. In some embodiments, each of the functionality steps as described above with respect to block 904 is additionally (or alternatively) used at block 906 (e.g., the word embedding, knowledge graph, or classifier functions) to determine whether search results are indicative of the accessory only.

Per block 908, based at least in part on the query and the determining steps (blocks 904 and 906), embodiments execute the query by ranking the search result candidates. Examples of the ranking functionality is described with respect to the search result ranker 107 of FIG. 1. In an illustrative example, if the query is for the accessory (and not the sub-accessory), the second set of search result candidates (indicative of the accessory) are ranked higher than the first set of search result candidates (indicative of the sub-accessory). Alternatively, if the query is for the sub-accessory (and not the accessory), the first set of search result candidates (sub-accessory) are ranked higher than the second set of search result candidates (accessory).

In some embodiments, executing the query at lock 908 is not performed on "both" of the determining steps of blocks 904 and 906. Rather, executing the query may be based on only one of the determining steps. For example, if the query is for an accessory, then the execution of the query may only be based on block 906 or 904 (but not both).

Per lock 910, based at least in part on the ranking, embodiments cause generation of a user interface. Examples of this are described with respect to the presentation component 111 of FIG. 1 and the screenshot 500 of FIG. 5.

Figure 10:
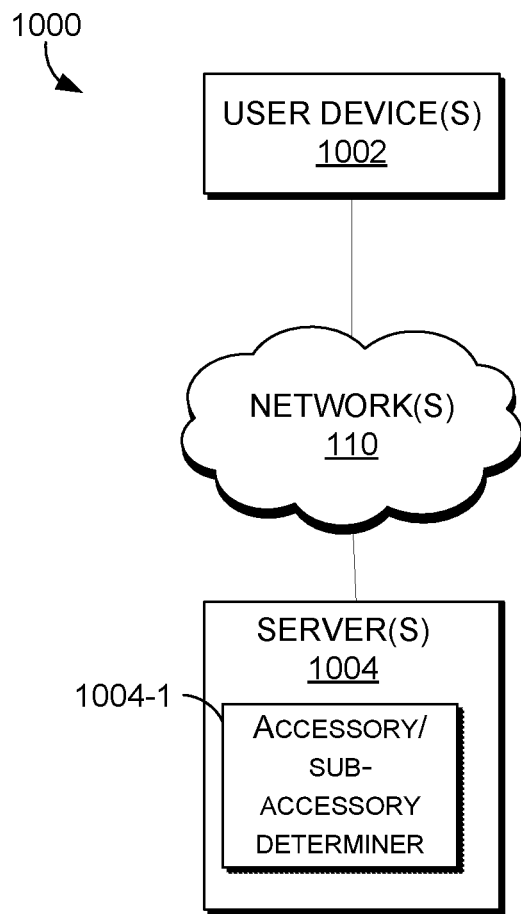
FIG. 10 is a block diagram of a computing environment in which aspects of the present technology are implemented within, according to some embodiments.

FIG. 10 is a block diagram of a computing environment 1000 in which aspects of the present disclosure are employed in, according to certain embodiments. Although the environment 1000 illustrates specific components at a specific quantity, it is recognized that more or less components may be included in the computing environment 1000. For example, in some embodiments, there are multiple user devices 1002 and multiple servers 1004, such as nodes in a cloud or distributing computing environment. In some embodiments, some or each of the components of the system 100 of FIG. 1 are hosted in the one or more servers 1004. In some embodiments, the user device(s) 1002 and/or the server(s) 1004 may be embodied in any physical hardware, such as the computing device 1100 of FIG. 11.

The one or more user devices 1002 are communicatively coupled to the server(s) 1004 via the one or more networks 110. In practice, the connection may be any viable data transport network, such as, for example, a LAN or WAN. Network(s) 110 can be for example, a local area network (LAN), a wide area network (WAN) such as the Internet, or a combination of the two, and include wired, wireless, or fiber optic connections. In general, network(s) 110 can be any combination of connections and protocols that will support communications between the control server(s) 1004 and the user devices 1002.

In some embodiments, a user issues a query on the one or more user devices 1002, after which the user device(s) 1002 communicate, via the network(s) 110, to the one or more servers 1004 and the one or more servers 1004 executes the query (e.g., via one or more components of FIG. 1) and causes or provides for display information back to the user device(s) 1002. For example, the user may issue a query at the user device 1002 that specifies one or more accessories or sub-accessories. Responsively, the one or more servers 1004 execute the query by determining whether the query and/or search result candidates are indicative of an accessory itself and/or a sub-accessory to the accessory via the accessory/sub-accessory determiner 1004-1. In some embodiments, the accessory/sub-accessory determiner 1004-1 represents or includes the functionality of the accessory/sub-accessory determiner 109 of FIG. 1, as described herein.

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 11:
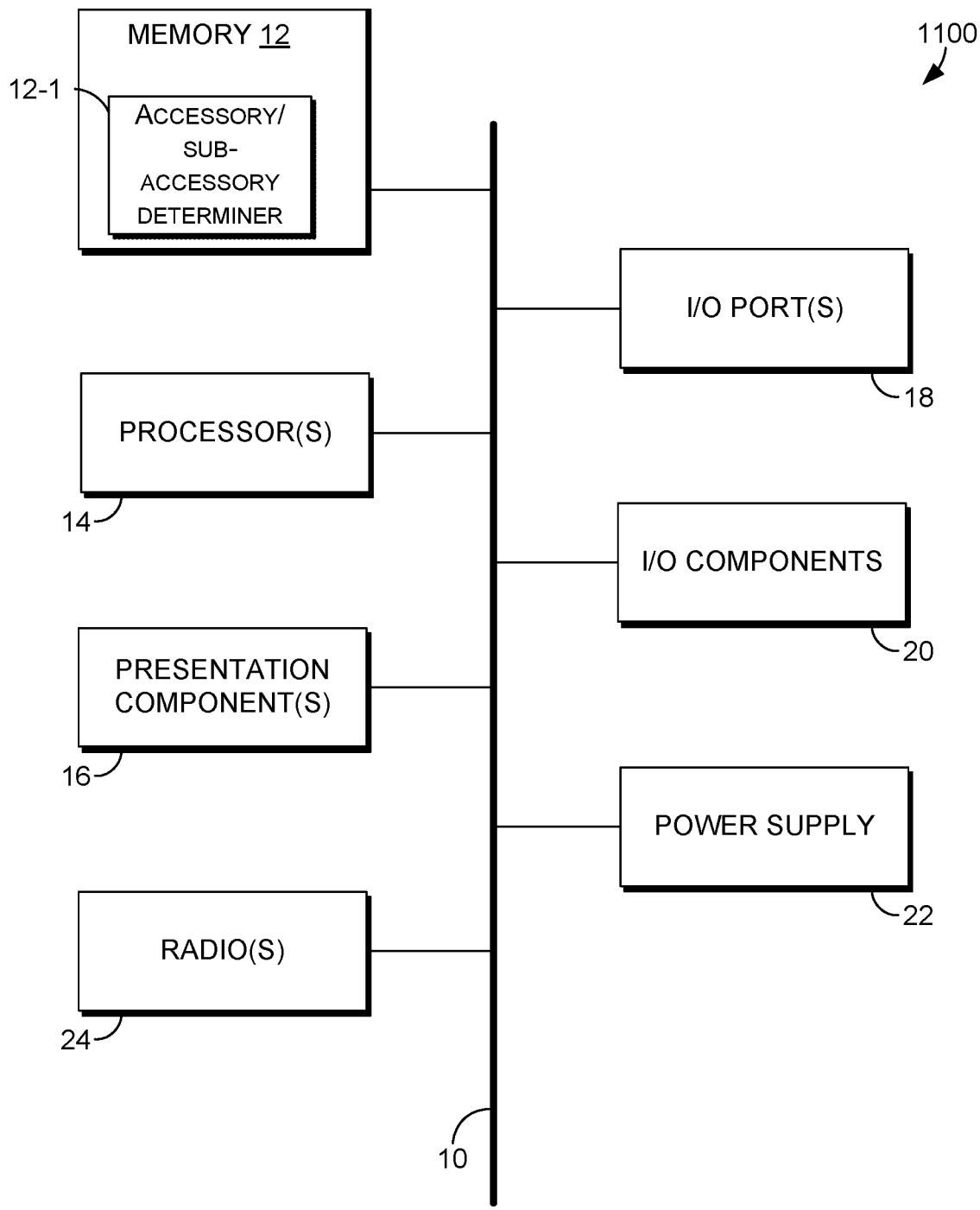
FIG. 11 is a block diagram of a computing device in which aspects of the present disclosure are implemented within, according to some embodiments.

With reference to FIG. 11, computing device 1100 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

In some embodiments, the computing device 1100 represents the physical embodiments of one or more systems and/or components described above. For example, the computing device 1100 can represent: the one or more user devices 1102, the server(s) 1104 of FIG. 10. The computing device 1100 can also perform some or each of the blocks in the process 800, 900 and/or any functionality described herein with respect to FIGS. 1-10. It is understood that the computing device 1100 is not to be construed necessarily as a generic computer that performs generic functions. Rather, the computing device 1100 in some embodiments is a particular machine or special-purpose computer. For example, in some embodiments, the computing device 1100 is or includes: a multi-user mainframe computer system, one or more cloud computing nodes, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors 14 that read data from various entities such as memory 12 or I/O components 20. Presentation component(s) 16 present data indications to a user or other device. Exemplary presentation components include a display device, speaker, printing component, vibrating component, etc. Memory 12 includes the accessory/sub-accessory determiner 12-1. In some embodiments, the accessory/sub-accessory determiner 12-1 represents or includes the functionality of the accessory/sub-accessory determiner 109 of FIG. 1, and/or the accessory/sub-accessory determiner 1004-1, as described herein.

I/O ports 18 allow computing device 1100 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion.

As described above, implementations of the present disclosure relate to automatically generating a user interface or rendering one or more applications based on contextual data received about a particular user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" or "component" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

What is claimed is:

1. A computerized system comprising:
   one or more processors; and
   computer storage memory having computer-executable instructions stored thereon which, when executed by the one or more processors, implement a method comprising:
   training a machine learning model to learn weights by processing vectorized input-label datasets, each input of the input-label datasets including at least one of a respective training query or a respective title of a search result, each label of the input-label datasets indicating whether a respective input of the input-label datasets refers to a particular accessory or a particular sub-accessory;
   subsequent to the training of the machine learning model, receiving, at a first page of a user interface, a query for a sub-accessory of an accessory of an item, the sub-accessory for sale in an electronic marketplace, the sub-accessory corresponding to a physical portion of the accessory, the accessory corresponding to a physical portion of the item;
   retrieving, from the computer storage memory, a first set of search result candidates and a second set of search result candidates for the query;
   encoding the query, the first search result candidates and the second search result candidates as one or more vectors by:
   converting, via a word tagging model, natural language sequences of the query and titles of the first search result candidates and the second search result candidates into first embedded vectors in a first vector space, converting, via a knowledge graph model, nodes and edges of a knowledge graph representing relationships between accessories and sub-accessories into second embedded vectors in a second vector space, and aggregating the first and second embedded vectors into a combined set of vectors including at least one feature selected from one or more of: a query term, a search result title, a price feature, a condition feature, or an aspect feature;

based on the training of the machine learning model to learn weights by processing vectorized input-label datasets and providing the combined set of vectors as input into the machine learning model, generating, via an output layer of the machine learning model, a first output layer vector indicative of a prediction that the first set of search result candidates for the query refer to the sub-accessory of the accessory and generating, via the output layer of the machine learning model, a second output layer vector indicative of a prediction that the second set of search result candidates for the query refer to the accessory only and not the sub-accessory based on the one or more vectors, wherein the machine learning model comprises a classification model that weights one or more features of the combined set of vectors;

based on the first output layer vector and the second output layer vector, identify that the first set of search result candidates for the query refer to the sub-accessory of the accessory and that the second set of search result candidate for the query refer to the accessory only and not the sub-accessory;

based at least in part on the query being for the sub-accessory of the accessory, the first output layer vector, the second output layer vector, and the identifying, ranking, via a search engine, the first set of search result candidates higher than the second set of search result candidates; and based at least in part on the search engine ranking, causing at least one of: reduced redundant query execution plans, decreased disk I/O operations, or decreased network packet transmissions by generating, at the first page of the user interface, of the first set of search result candidates and suppressing one or more of the second set of search result candidates from being returned at the first page of the user interface.

2. The computerized system of claim 1, wherein the accessory is a part of the item, the part being a first attachable component that makes up a portion of the item, and wherein the sub-accessory is a sub-part of the accessory, the sub-part being a second attachable component that makes up a portion of the accessory.

3. The computerized system of claim 1, wherein the determining that the first set of search result candidates refer to the sub-accessory to the accessory is based at least in part on using a word embedding model to determine one or more semantic relationships between the query and a plurality of search result candidates, the plurality of search result candidates include the first set of search result candidates and the second set of search result candidates.

4. The computerized system of claim 1, wherein the determining that the first set of search result candidates refer to the sub-accessory to the accessory is based at least in part on using a knowledge graph and a word embedding model.

5. The computerized system of claim 1, wherein the determining that the first set of search result candidates refer to the sub-accessory to the accessory is based at least in part on a classifier machine learning model to predict that the first set of search results candidates refer to the sub-accessory.

6. The computerized system of claim 1, wherein the machine learning model is a classifier machine learning model that uses historical query features, historical title features, and knowledge graph information associated with the accessory as inputs to predict that the first set of search results candidates refer to the sub-accessory.

7. The computerized system of claim 6, wherein the machine learning model further uses at least one of: a condition of the sub-accessory, a price of the sub-accessory, and aspect features of the sub-accessory as the input.

8. A computer-implemented method comprising:

training a machine learning model to learn weights by processing vectorized input-label datasets, each input of the input-label datasets including at least one of a respective training query or a respective title of a search result, each label of the input-label datasets indicating whether a respective input of the input-label datasets refers to a particular accessory or a particular sub-accessory;

subsequent to the training of the machine learning model, receiving a query for a sub-accessory of an accessory of an item, the sub-accessory for sale in an electronic marketplace, the sub-accessory corresponding to a physical portion of the accessory or a supplemental component of the accessory, the accessory corresponding to a physical portion of the item or a supplemental component of the item;

retrieving, from computer storage media, a first set of search result candidates and a second set of search result candidates for the query;

encoding the query, the first search result candidates and the second search result candidates as one or more vectors;

based on the training of the machine learning model to learn weights by processing vectorized input-label datasets and providing the one or more vectors as input into the machine learning model, generating, via an output layer of the machine learning model, a first output vector indicative of a prediction that the first set of search result candidates for the query refer to the sub-accessory of the accessory based on the one or more vectors;

based on the training of the machine learning model to learn weights by processing vectorized input-label datasets and providing the one or more vectors as input into the machine learning model, generating, via the output layer of the machine learning model, a second output layer vector indicative of a prediction that the second set of search result candidates for the query refer to at least one of the accessory or the item but not the sub-accessory based on the one or more vectors;

based on the first output layer vector and the second output layer vector, identify that the first set of search result candidates for the query refer to the sub-accessory of the accessory and that the second set of search result candidate for the query refer to the accessory only and not the sub-accessory;

based at least in part on the query being for the sub-accessory of the accessory, the first output layer vector, and the second layer vector and the identifying, ranking, via a search engine, the first set of search result candidates higher than the second set of search result candidates; and based at least in part on the search engine ranking, causing at least one of: reduced redundant query execution plans, decreased disk I/O operations, or decreased network packet transmissions by generating the first set of search result candidates and suppressing one or more of the second set of search result candidates from being returned at the first page of the user interface.

9. The computer-implemented method of claim 8, wherein the accessory is a part of the item, the part being a first attachable component that makes up a portion of the item, and wherein the sub-accessory is a sub-part of the accessory, the sub-part being a second attachable component that makes up a portion of the accessory.

10. The computer-implemented method of claim 8,
wherein sub-accessory is a supplemental component of the accessory, the supplemental component is for use in conjunction with the accessory as a complimentary good.

11. The computer-implemented method of claim 8, wherein the determining that the first set of search result candidates refer to the sub-accessory to the accessory is based at least in part on using a word embedding model to determine one or more semantic relationships between the query and a plurality of search result candidates, the plurality of search result candidates include the first set of search result candidates and the second set of search result candidates.

12. The computer-implemented method of claim 8, wherein the encoding the query, the first search result candidates and the second search result candidates as one or more vectors includes:
converting, via a word tagging model, natural language sequences of the query and titles of the first search result candidates and the second search result candidates into first embedded vectors in a first vector space,
converting, via a knowledge graph model, nodes and edges of a knowledge graph representing relationships between accessories and sub-accessories into second embedded vectors in a second vector space, and
aggregating the first and second embedded vectors into a combined set of vectors including at least one feature selected from one or more of: a query term, a search result title, a price feature, a condition feature, or an aspect feature;
wherein the generating, via the output layer of the machine learning model, of the first output vector is further based on providing the combined set of vectors as input into the machine learning model.

13. The computer-implemented method of claim 8, wherein the determining that the first set of search result candidates refer to the sub-accessory to the accessory is based at least in part on a classifier machine learning model to predict that the first set of search results candidates refer to the sub-accessory.

14. The computer-implemented method of claim 8, wherein the machine learning model is a classifier machine learning model that uses historical query features, historical title features, and knowledge graph information associated with the accessory as inputs to predict that the first set of search results candidates refer to the sub-accessory.

15. The computer-implemented method of claim 14, wherein the machine learning model further uses at least one of: a condition of the sub-accessory, a price of the sub-accessory, and aspect features of the sub-accessory as the input.

16. One or more computer storage media having computer-executable instructions embodied thereon that, when executed, by one or more processors, cause the one or more processors to perform a method, the method comprising:
training a machine learning model to learn weights by processing vectorized input-label datasets, each input of the input-label datasets including at least one of a respective training query or a respective title of a search result, each label of the input-label datasets indicating whether a respective input of the input-label datasets refers to a particular accessory or a particular sub-accessory;
subsequent to the training of the machine learning model, receiving a query for a sub-accessory of an accessory of an item, the sub-accessory corresponding to a physical portion of the accessory or a supplemental component of the accessory, the accessory corresponding to a physical portion of the item or a supplemental component of the item;
retrieving, from the one or more computer storage media, a first set of search result candidates and a second set of search result candidates for the query;
encoding the query, the first search result candidates and the second search result candidates as one or more vectors by engaging in at least one of:
converting, via a word tagging model, natural language sequences of the query and titles of the first search result candidates and the second search result candidates into first embedded vectors in a first vector space,
converting, via a knowledge graph model, nodes and edges of a knowledge graph representing relationships between accessories and sub-accessories into second embedded vectors in a second vector space, or
aggregating the first and second embedded vectors into a combined set of vectors including at least one feature selected from one or more of: a query term, a search result title, a price feature, a condition feature, or an aspect feature;
based on the training of the machine learning model to learn weights by processing vectorized input-label datasets and providing the one or more vectors as input into a machine learning model, generating, via an output layer of the machine learning model, a first output layer vector indicative of a prediction that the first set of search result candidates for the query refer to the sub-accessory of the accessory based on the one or more vectors;
wherein the machine learning model generates, via the output layer, a second output layer vector indicative of a prediction that the second set of search result candidates for the query refer to at least one of the accessory or the item but not the sub-accessory based on the one or more vectors;
based at least in part on the query being for the sub-accessory of the accessory, the first output layer vector and the second output layer vector, ranking, via a search engine, the first set of search result candidates higher than the second set of search result candidates; and based at least in part on the search engine ranking, causing generation of the first set of search result candidates and not one or more of the second set of search result candidates.

17. The computer storage media of claim 16, wherein the accessory is a part of the item, the part being a first attachable component that makes up a portion of the item, and wherein the sub-accessory is a sub-part of the accessory, the sub-part being a second attachable component that makes up a portion of the accessory.

18. The computer storage media of claim 16, wherein sub-accessory is a supplemental component of the accessory, the supplemental component is for use in conjunction with the accessory as a complimentary good.

19. The computer storage media of claim 16, wherein the determining that the first set of search result candidates refer to the sub-accessory to the accessory is based at least in part on using a word embedding model to determine one or more semantic relationships between the query and a plurality of search result candidates, the plurality of search result candidates include the first set of search result candidates and the second set of search result candidates.

20. The computer storage media of claim 16, wherein the determining that the first set of search result candidates refer the sub-accessory to the accessory is based at least in part on using a knowledge graph and a word embedding model.

\* \* \* \* \*